(12) United States Patent
Boissiere et al.

(10) Patent No.: US 9,670,342 B2
(45) Date of Patent: Jun. 6, 2017

(54) POLYETHYLENE FOR INJECTION STRETCH BLOW MOLDING APPLICATIONS

(71) Applicant: TOTAL RESEARCH & TECHNOLOGY FELUY, Seneffe (BE)

(72) Inventors: Jean-Marie Boissiere, La Garenne Colombes (FR); Aurélien Vantomme, Mignault (BE); Jurjen Meeuwissen, Amsterdam (NL)

(73) Assignee: Total Research & Technology Feluy, Senegge (BE)

( * ) Notice: Subject to any disclaimer, the term of this patent is extended or adjusted under 35 U.S.C. 154(b) by 0 days.

(21) Appl. No.: 14/911,627

(22) PCT Filed: Aug. 12, 2014

(86) PCT No.: PCT/EP2014/067199
§ 371 (c)(1),
(2) Date: Feb. 11, 2016

(87) PCT Pub. No.: WO2015/022303
PCT Pub. Date: Feb. 19, 2015

(65) Prior Publication Data
US 2016/0200904 A1    Jul. 14, 2016

(30) Foreign Application Priority Data

Aug. 12, 2013 (EP) .................................... 13180073

(51) Int. Cl.
| | | |
|---|---|---|
| C08L 23/06 | (2006.01) | |
| B29C 49/00 | (2006.01) | |
| B29C 49/06 | (2006.01) | |
| C08L 23/08 | (2006.01) | |
| B29K 105/00 | (2006.01) | |
| B29L 31/00 | (2006.01) | |
| B29C 49/12 | (2006.01) | |

(52) U.S. Cl.
CPC ...... *C08L 23/0815* (2013.01); *B29C 49/0005* (2013.01); *B29C 49/12* (2013.01); *B29K 2023/04* (2013.01); *B29K 2023/06* (2013.01); *B29K 2105/0014* (2013.01); *B29L 2031/7158* (2013.01); *C08L 2205/025* (2013.01); *C08L 2205/03* (2013.01); *C08L 2205/035* (2013.01); *C08L 2207/20* (2013.01); *C08L 2314/02* (2013.01)

(58) Field of Classification Search
None
See application file for complete search history.

(56) References Cited

U.S. PATENT DOCUMENTS

| | | | |
|---|---|---|---|
| 5,106,804 A | 4/1992 | Bailly et al. | |
| 5,153,158 A | 10/1992 | Kioka et al. | |
| 5,594,071 A | 1/1997 | Takahashi et al. | |
| 6,864,207 B2 | 3/2005 | Knoeppel et al. | |
| 6,930,071 B2 | 8/2005 | Knoeppel et al. | |
| 2010/0261848 A1* | 10/2010 | Wang ................ | B29C 45/0001 525/240 |
| 2016/0237266 A1* | 8/2016 | Michie, Jr. ............ | C08F 210/16 |

FOREIGN PATENT DOCUMENTS

| | | |
|---|---|---|
| CN | 101230161 A | 7/2008 |
| CN | 101616963 A | 12/2009 |
| CN | 102361925 A | 2/2012 |
| CN | 102471409 A | 5/2012 |
| CN | 102686618 A | 9/2012 |
| CN | 102844333 A | 12/2012 |
| JP | 2000-86833 A | 3/2000 |
| WO | 2011057924 A1 | 5/2011 |
| WO | 2012095423 A1 | 7/2012 |

OTHER PUBLICATIONS

International Search Report issued in PCT/EP2014/067199, dated Nov. 6, 2014, 3 pages.
C. Vasile and M. Pascu, "Practical Guide to Polyethylene"; 2005, ISBN 1-85957-493-9, section 2.1.9 p. 20.
D.B.Malpass, "Introduction to Industrial Polyethylene: Properties, Catalysts, Processes"; 2010, section 3.3, pp. 33-44.
J.B.P. Soares and A. E. Hamielec, "Temperature rising elution fractionation of linear polyolefins", Polymer, 36 (8), 1995 pp. 1639-1654.
Wagner et al., "Rheotens-Mastercurves and Drawability of Polymer Melts", Polym. Eng. Sci. 36 (7), pp. 925-935, 1996.
Plastics Additives Handbook, ed. H. Zweifel, 5th edition, 2001, Hanser Publishers.
Office Action issued in Chinese Application No. 2014800558923, dated Mar. 23, 2017, 16 pages.

\* cited by examiner

*Primary Examiner* — Jeffrey Mullis
(74) *Attorney, Agent, or Firm* — Albert Shung

(57) ABSTRACT

An injection stretch blow molded article may include a Ziegler-Natta catalyzed polyethylene resin having a multimodal molecular weight distribution and including at least two polyethylene fractions A and B. Fraction A may have a higher molecular weight and a lower density than fraction B. Each fraction may be prepared in different reactors of at least two reactors connected in series. Fraction A may have a melt index HL275 of at least 11 g/10 min and of at most 20 g/10 min, and a density of at least 941 kg/m$^3$ and of at most 946 kg/m$^3$. The polyethylene resin may have a melt index MI2 of at least 1.5 g/10 min and of at most 3.0 g/10 min, and a density of at least 950 kg/m$^3$ and of at most 965 kg/m$^3$.

26 Claims, 4 Drawing Sheets

POLYETHYLENE FOR INJECTION STRETCH BLOW MOLDING APPLICATIONS

CROSS-REFERENCE TO RELATED APPLICATIONS

This application is a National Stage Entry of PCT/EP2014/067199, filed on Aug. 12, 2014; which claims priority to EP 13180073.2, filed on Aug. 12, 2013.

FIELD OF INVENTION

The present invention relates to an injection stretch blow molded article, prepared from Ziegler-Natta catalyzed polyethylene resin, wherein the polyethylene resin has a multimodal molecular weight distribution.

BACKGROUND OF THE INVENTION

Injection stretch blow molding (ISBM) is a process widely used for the production of containers, such as bottles, using thermoplastic polymers. The process includes the steps of preparing a preform by injection molding and then expanding the preform to the desired final shape. In general, one distinguishes one-stage processes and two stage-processes. In the one-stage process, the steps of producing preform and expanding the preform to the desired final shape are performed in the same machine. In the two-stage process these two steps are performed in different machines, in some cases even in different geographical locations—the preform is allowed to cool to ambient temperature and is then transported to a second machine, where it is reheated and expanded to the desired final shape. Due to reasons of production speed and flexibility the two-stage process is preferred for larger production volumes.

Recent progress in development has made polypropylene a viable alternative to polyethylene terephthalate (PET) for injection stretch blow molding (ISBM). Due to their good optical properties propylene-ethylene random co-polymers are the preferred polypropylene grades.

For the injection molding of polypropylene it is well known to improve the impact performance, while also having good optical properties by the addition of a polyethylene, which has been produced using metallocene catalyst.

The polypropylenes presently used in the injection stretch blow molding applications allow the production of containers with good optical properties at industrially viable production rates. However, as compared to the other polymers used in the injection stretch blow molding polypropylene suffers from a lack of the combination of high rigidity and high ESCR, as well as high impact strength, particularly at lower temperatures. There is a need for new polyolefins having improved injection properties and blow molding properties.

SUMMARY OF THE INVENTION

According to a first aspect, the present invention provides an injection stretch blow molded article, comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min as determined according to ISO 1133, condition G, at 190° C. and under a load of 21.6 kg except that a die of 275 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

The present invention also encompasses a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

The present invention also encompasses an injection stretch blow molded article according to the first aspect of the invention, wherein said article is a container.

According to a second aspect, the present invention provides the use of the injection stretch blow molded article according to the first aspect for the packaging of feed; packaging of food, such as juices, dry products and dairy products; the packaging of cosmetics; detergents; lubricants; packaging of chemicals; agrochemicals; and pharmaceutical products.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
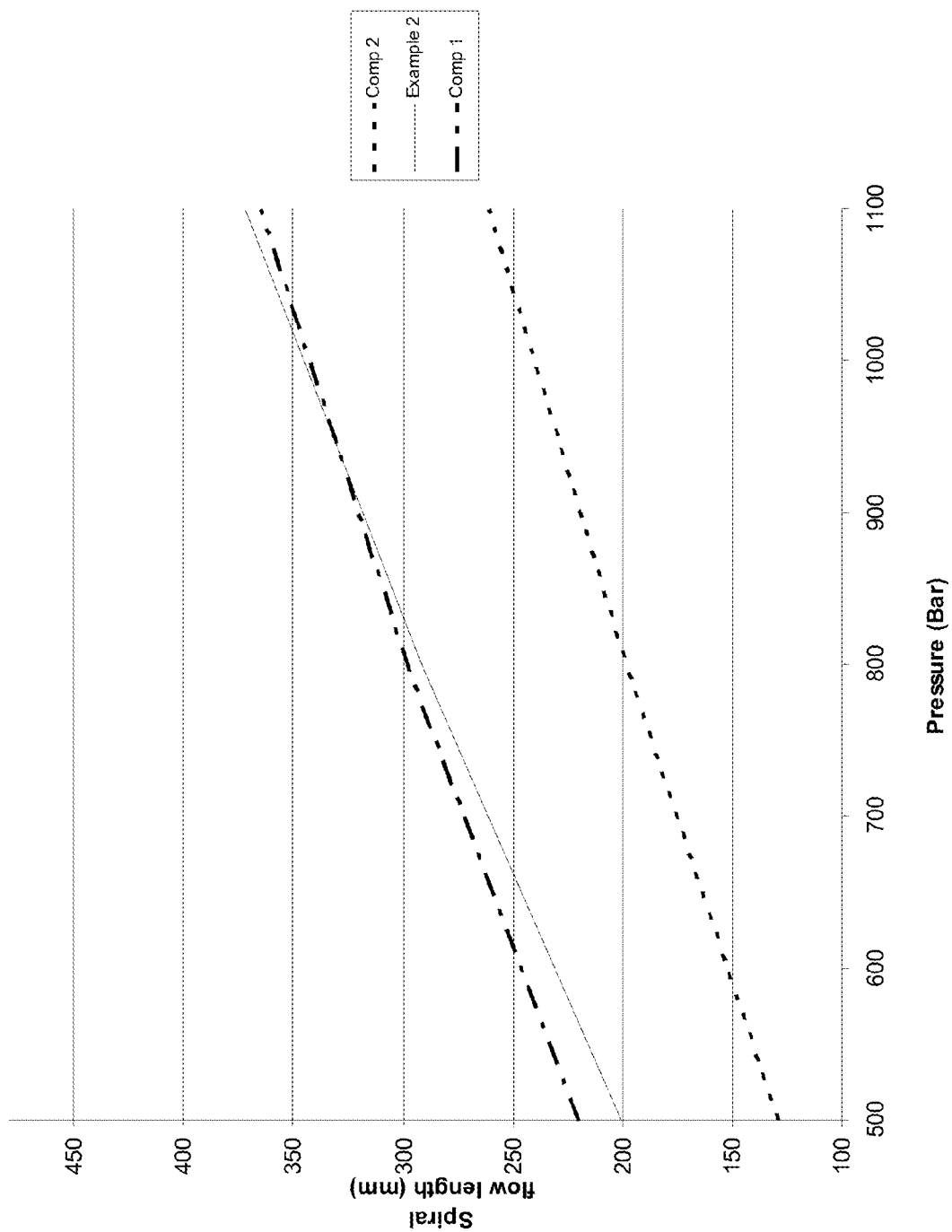
FIG. 1 represents a graph plotting spiral flow length (SFL) as a function of increasing injection pressure for a Ziegler-Natta catalyzed polyethylene resin according to an embodiment of the present invention versus comparative examples.

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

When describing the polyethylenes and processes of the invention, the terms used are to be construed in accordance with the following definitions, unless a context dictates otherwise.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Preferred statements (features) and embodiments of the articles, resins and uses of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 74, with any other statement and/or embodiments.

1. A Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

2. A Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min, as determined according to ISO 1133, condition D, at 190° C. and under a load of 2.16 kg; and a density of at least 950 kg/m$^3$ and of at most 965 kg/m$^3$.

3. A Ziegler-Natta catalyzed polyethylene resin, wherein the polyethylene resin comprises at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

4. A Ziegler-Natta catalyzed polyethylene resin, wherein the polyethylene resin comprises at least two polyethylene fractions A and B, fraction A having a higher molecular weight and a lower density than fraction B, each fraction prepared in different reactors of at least two reactors connected in series, wherein:
  fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and
  the polyethylene resin has a melt index MI2 of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min, as determined according to ISO 1133, condition D, at 190° C. and under a load of 2.16 kg; and a density of at least 950 kg/m$^3$ and of at most 965 kg/m$^3$.

5. A polyethylene resin obtainable by preparing a resin comprising at least two Ziegler-Natta catalyzed polyethylene fractions A and B, fraction A having a higher molecular weight and a lower density than fraction B, each fraction prepared in different reactors of at least two reactors connected in series, wherein:
  fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and
  the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

6. A polyethylene resin obtainable by preparing a resin comprising at least two Ziegler-Natta catalyzed polyethylene fractions A and B, fraction A having a higher molecular weight and a lower density than fraction B, each fraction prepared in different reactors of at least two reactors connected in series, wherein:
  fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and
  the polyethylene resin has a melt index MI2 of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min, as determined according to ISO 1133, condition D, at 190° C. and under a load of 2.16 kg; and a density of at least 950 kg/m$^3$ and of at most 965 kg/m$^3$.

7. A polyethylene resin obtainable by:
  preparing a Ziegler-Natta catalyzed polyethylene fraction A, wherein fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.;
  preparing a Ziegler-Natta catalyzed polyethylene fraction B, fraction A having a higher molecular weight and a lower density than fraction B;
  wherein each fraction is prepared in different reactors of at least two reactors connected in series;
  wherein the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

8. A polyethylene resin obtainable by:
  preparing a Ziegler-Natta catalyzed polyethylene fraction A, wherein fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.;
  preparing a Ziegler-Natta catalyzed polyethylene fraction B, fraction A having a higher molecular weight and a lower density than fraction B;
  wherein each fraction is prepared in different reactors of at least two reactors connected in series;
  wherein the polyethylene resin has a melt index MI2 of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min, as determined according to ISO 1133, condition D, at 190° C. and under a load of 2.16 kg; and a density of at least 950 kg/m$^3$ and of at most 965 kg/m$^3$.

9. The resin according to any one of statements 1 to 8, wherein said fraction A has a melt index HL275 of at least 12 g/10 min and of at most 18 g/10 min.

10. The resin according to any one of statements 1 to 9, wherein said fraction A has a melt index HL275 of at least 12 g/10 min and of at most 18 g/10 min and wherein the polyethylene resin has a MI2 of at least 1.5 g/10 min and of at most 2.6 g/10 min.

11. The resin according to any one of statements 1 to 10, wherein the polyethylene resin has a MI2 of at least 1.5 g/10 min and of at most 2.6 g/10 min.

12. The resin according to any one of statements 1 to 11, wherein the polyethylene resin has a density of at least 955 kg/m$^3$ and of at most 962 kg/m$^3$, more preferably of at least 958 kg/m$^3$ and of at most 960 kg/m$^3$.

13. The resin according to any one of statements 1 to 12, wherein the polyethylene resin has a density of at least 955 kg/m$^3$ and of at most 962 kg/m$^3$, more preferably of at least 958 kg/m$^3$ and of at most 960 kg/m$^3$, and wherein the polyethylene resin has a MI2 of at least 1.5 g/10 min and of at most 2.6 g/10 min.

14. The resin according to any one of statements 1 to 13, wherein fraction A is present in an amount ranging from 44 to 49% by weight based on the total weight of polyethylene resin; preferably ranging from 45 to 49%, for example from 46 to 49%, for example from 46 to 48%, for example 47% by weight based on the total weight of polyethylene resin.

15. The resin according to any one of statements 1 to 14, wherein fraction A is present in an amount ranging from 44 to 49% by weight based on the total weight of polyethylene resin; preferably ranging from 45 to 49%, for example from 46 to 49%, for example from 46 to 48%, for example 47% by weight based on the total weight of polyethylene resin, and wherein the polyethylene resin has a MI2 of at least 1.5 g/10 min and of at most 2.6 g/10 min.

16. The resin according to any one of statements 1 to 15, wherein the Ziegler-Natta catalyst has a particle size distribution d50 ranging from 5 µm to 20 µm, preferably of at least 5 µm and of at most 15 µm, more preferably of at least 5 µm and of at most 12 µm and most preferably of at least 5 µm and of at most 9 µm.

17. The resin according to any one of statements 1 to 16, wherein the Ziegler-Natta catalyst has a particle size distribution d50 ranging from 5 µm to 20 µm, preferably of at least 5 µm and of at most 15 µm, more preferably of at least 5 µm and of at most 12 µm and most preferably of at least 5 µm and of at most 9 µm, and wherein the polyethylene resin has a MI2 of at least 1.5 g/10 min and of at most 2.6 g/10 min.

18. The resin according to any one of statements 1 to 17, obtainable by preparing polyethylene fractions A and B with a Ziegler-Natta catalyst, wherein the Ziegler-Natta catalyst has a particle size distribution d50 ranging from 5 µm to 20 µm.

19. The resin according to any one of statements 1 to 18, obtainable by preparing polyethylene fractions A and B with a Ziegler-Natta catalyst, wherein the Ziegler-Natta catalyst has a particle size distribution d50 ranging from 5 µm to 20 µm, and wherein the polyethylene resin has a MI2 of at least 1.5 g/10 min and of at most 2.6 g/10 min.

20. The resin according to any one of statements 1 to 19, wherein the polyethylene resin has a molecular weight distribution Mw/Mn of at least 7 and of at most 11. Mw being the weight-average molecular weight and Mn being the number-average molecular weight.

21. The resin according to any one of statements 1 to 20, wherein the polyethylene resin has a molecular weight distribution Mw/Mn of at least 7 and of at most 11. Mw being the weight-average molecular weight and Mn being the number-average molecular weight, and wherein the polyethylene resin has a MI2 of at least 1.5 g/10 min and of at most 2.6 g/10 min.

22. The resin according to any one of statements 1 to 21, wherein the polyethylene resin has a Mz/Mw of at least 4.5 and of at most 6.5, Mz being the z-average molecular weight.

23. The resin according to any one of statements 1 to 22, wherein the polyethylene resin has a Mz/Mw of at least 4.5 and of at most 6.5, Mz being the z-average molecular weight, and wherein the polyethylene resin has a MI2 of at least 1.5 g/10 min and of at most 2.6 g/10 min.

24. The resin according to any one of claims 1 to 23, wherein said polyethylene resin is prepared in slurry conditions.

25. The resin according to any one of statements 1 to 24, wherein the Ziegler-Natta catalyzed polyethylene resin has an environmental stress crack resistance measured with 100% Igepal CO-630 of at least 40 h, preferably at least 60 h, preferably, at least 80 h, more preferably at least 100 h.

26. The resin according to any one of statements 1 to 25, wherein each reactor is a loop reactor.

27. The resin according to any of statements 1 to 26, wherein fraction A was prepared in the first reactor of the at least two reactors connected in series.

28. The resin according to any of statements 1 to 27, wherein fraction A was prepared in the first reactor of the at least two reactors connected in series, and wherein the polyethylene resin has a MI2 of at least 1.5 g/10 min and of at most 2.6 g/10 min.

29. The resin according to any of statements 1 to 28, wherein fraction B was prepared in the first reactor of the at least two reactors connected in series.

30. The resin according to any of statements 1 to 29, wherein fraction B was prepared in the second reactor of the at least two reactors connected in series.

31. The resin according to any of statements 1 to 30, wherein the resin has a bimodal molecular weight distribution.

32. The resin according to any of statement 1 to 31, wherein the resin is obtainable by a process comprising the steps of:
  (a) feeding ethylene monomer, a diluent, at east one Ziegler-Natta catalyst, optionally hydrogen, and optionally one or more olefin co-monomers into at least one first slurry loop reactor; polymerizing the ethylene monomer, and the optionally one or more olefin co-monomers, in the presence of the Ziegler-Natta catalyst, and optional hydrogen, in said first slurry loop reactor to produce a first polyethylene fraction;
  (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the polyethylene resin.

33. The resin according to any of statements 1 to 32, wherein the resin is obtainable by a process comprising the steps of:
  (a) feeding ethylene monomer, a diluent, at least one Ziegler-Natta catalyst, hydrogen, into a first slurry loop reactor; polymerizing the ethylene monomer, in the presence of the Ziegler-Natta catalyst, and hydrogen, in said first slurry loop reactor to produce a first polyethylene fraction;
  (b) feeding the first polyethylene fraction to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the polyethylene resin.

34. The resin according to any of statements 1 to 33, wherein the resin is obtainable by a process comprising the steps of:
  (a) feeding ethylene monomer, a diluent, at least one Ziegler-Natta catalyst, optionally hydrogen, and 1-hexene comonomer into a first slurry loop reactor; polymerizing the ethylene monomer, and the 1-hexene in the presence of the Ziegler-Natta catalyst, and optional hydrogen in said first slurry loop reactor to produce a first polyethylene fraction A; and
  (b) feeding the first polyethylene fraction A to a second slurry loop reactor serially connected to the first slurry loop reactor, and in the second slurry loop reactor polymerizing ethylene, in the presence of the first polyethylene fraction A, and hydrogen, thereby producing the polyethylene resin comprising fraction A and a fraction B, wherein fraction A has a higher molecular weight and a lower density than fraction B.

35. The resin according to any of statements 1 to 34, wherein fraction A has a density of at least 941 kg/m$^3$ and of at most 946 kg/m$^3$, preferably of at least 941.5 kg/m$^2$ and of at most 946 kg/m$^3$, more preferably of at most 945.5 kg/m³, for example of a least 941.5 kg/m³ to at most 945.5 kg/m³, as measured according to ASTM 1505 at a temperature 23° C.

36. The resin according to any of statements 1 to 35, wherein fraction A has a density of at least 941 kg/m³ and of at most 946 kg/m³, preferably of at least 941.5 kg/m³ and of at most 946 kg/m³, more preferably of at most 945.5 kg/m³, for example of at least 941.5 kg/m³ to at most 945.5 kg/m³, as measured according to ASTM 1505 at a temperature 23° C., and wherein the polyethylene resin has a MI2 of at least 1.5 g/10 min and of at most 2.6 g/10 min.

37. The resin according to any of statements 1 to 36, wherein fraction B has a melt index MI2 of at least 20 g/10 min, and of at most 165 g/10 min as measured according to ISO 1133 condition D at a temperature of 190° C. and under a load of 2.16 kg, preferably of at least 30 g/10 min and of at most 100 g/10 min, preferably of at least 50 g/10 min and of at most 100 g/10 min, preferably of at least 60 g/10 min and of at most 80 g/10 min.

38. The resin according to any of statements 1 to 37, wherein fraction B has a melt index MI2 of at least 20 g/10 min, and of at most 165 g/10 min as measured according to ISO 1133 condition D at a temperature of 190° C. and under a load of 2.16 kg, preferably of at least 30 g/10 min and of at most 100 g/10 min, preferably of at least 50 g/10 min and of at most 100 g/10 min, preferably of at least 60 g/10 min and of at most 80 g/10 min, and wherein the polyethylene resin has a MI2 of at least 1.5 g/10 min and of at most 2.6 g/10 min.

39. The resin according to any of statements 1 to 38, wherein the resin has a melt index MI2 of at least 1.5 g/10 min and at most 3.0 g/10 min measured from the pellets, preferably of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min.

40. An injection stretch blow molded article, comprising a polyethylene resin according to any one of statements 1 to 39.

41. An article obtainable by the process of:
providing a polyethylene resin according to any one of statements 1 to 39;
injection stretch blow molding the polyethylene resin into an injection stretch blow molded article.

42. An injection stretch blow molded article, comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; and
the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m³ and of at most 965 kg/m³.

43. An injection stretch blow molded article, comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; and
the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m³ and of at most 965 kg/m³;
wherein the Ziegler-Natta catalyst has a particle size distribution d50 ranging from 5 μm to 20 μm, preferably of at least 5 μm and of at most 15 μm, more preferably of at least 5 μm and of at most 12 μm and most preferably of at least 5 μm and of at most 9 μm.

44. An injection stretch blow molded article, comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; and
the polyethylene resin has a melt index MI2 of at least 1.5 g/10 min and of at most 2.6 g/10 min as determined according to ISO 1133, condition D, at 190° C. and under a load of 2.16 kg; and a density of at least 950 kg/m³ and of at most 965 kg/m³.

45. An injection stretch blow molded article, comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; and
the polyethylene resin has a melt index MI2 of at least 1.5 g/10 min and of at most 2.6 g/10 min as determined according to ISO 1133, condition D, at 190° C. and under a load of 2.16 kg; and a density of at least 950 kg/m³ and of at most 965 kg/m³;
wherein the Ziegler-Natta catalyst has a particle size distribution d50 ranging from 5 μm to 20 μm, preferably of at least 5 μm and of at most 15 μm, more preferably of at least 5 μm and of at most 12 μm and most preferably of at least 5 μm and of at most 9 μm.

46. The article according to any one of statements 40 to 45, wherein said fraction A has a melt index HL275 of at least 12 g/10 min and of at most 18 g/10 min.

47. The article according to any one of statements 40 to 46, wherein the polyethylene resin has a MI2 of at least 1.5 g/10 min and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min.

48. The article according to any one of statements 40 to 47, wherein the polyethylene resin has a density of at least 955 kg/m$^3$ and of at most 962 kg/m$^3$, more preferably of at least 958 kg/m$^3$ and of at most 960 kg/m$^3$.

49. The injection stretch blow molded article according to any one of statements 40 to 48, wherein fraction A is present in an amount ranging from 44 to 49% by weight based on the total weight of polyethylene resin; preferably ranging from 45 to 49%, for example from 46 to 49%, for example from 46 to 48%, for example 47% by weight based on the total weight of polyethylene resin.

50. The article according to any one of statements 40 to 49, wherein the Ziegler-Natta catalyst has a particle size distribution d50 ranging from 5 μm to 20 μm, preferably of at least 5 μm and of at most 15 μm, more preferably of at least 5 μm and of at most 12 μm and most preferably of at least 5 μm and of at most 9 μm.

51. The article according to any one of statements 40 to 50, wherein the polyethylene resin has a molecular weight distribution Mw/Mn of at least 7 and of at most 11, Mw being the weight-average molecular weight and Mn being the number-average molecular weight.

52. The article according to any one of statements 40 to 51, wherein the polyethylene resin has a Mz/Mw of at least 4.5 and of at most 6.5, Mz being the z-average molecular weight.

53. The article according to any one of claims 40 to 52, wherein said polyethylene resin is prepared in slurry conditions.

54. The article according to any one of statements 40 to 53, wherein the Ziegler-Natta catalyzed polyethylene resin has an environmental stress crack resistance measured with 100% Igepal CO-630 of at least 40 h, preferably at least 60 h, preferably, at least 80 h, more preferably at least 100 h.

55. The article according to any one of statements 40 to 54, wherein each reactor is loop reactor.

56. The article according to any one of statements 40 to 55, wherein the article is a container, preferably wherein the container weighs from 10 to 150 g per dm$^3$ of volume.

57. The article according to any one of statements 40 to 56, wherein fraction A was prepared in the first reactor of the at least two reactors connected in series.

58. Use of an article according to any one of statements 40 to 57 for the packaging of feed; food; cosmetics; detergents; lubricants; chemicals; agrochemicals; and pharmaceutical products.

59. The resin or article according to any of statements 1 to 57, further comprising a chromium-catalyzed polyethylene resin.

60. The resin or article according to statement 59, wherein the ratio of the Ziegler-Natta catalyzed polyethylene resin to the chromium-catalyzed polyethylene resin is at least 20:1, preferably at least 10:1, preferably at least 9:1, preferably at least 8:1, preferably at least 7:1, preferably at least 6:1, preferably at least 5:1, preferably at least 4:1, preferably at least 3:1, for example at least 2:1, for example about 1:1.

61. The resin or article according to any one of statements 59 to 60, wherein the chromium-catalyzed polyethylene resin has a density of at least 0.950 to at most 0.965 g/cm$^3$ and a melt index MI2 of at least 0.1 to at most 5.0 g/10 min.

62. The resin or article according to any one of statements 59 to 61, wherein the chromium-catalyzed polyethylene resin has a density of at least 0.952 to at most 0.965 g/cm$^3$, preferably of at least 0.954 to at most 0.964 g/cm$^3$, preferably of at least 0.956 to at most 0.964 g/cm$^3$, preferably of at least 0.958 to at most 0.963 g/cm$^3$, preferably of at least 0.960 to at most 0.963 g/cm$^3$. In some preferred embodiments, the chromium-catalyzed polyethylene resin has a melt index MI2 of at least 0.2 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.7 to at most 0.9 g/10 min.

63. The resin or article according to any one of statements 1 to 57, further comprising a low density polyethylene resin (LDPE).

64. The resin or article according to statement 63, wherein the ratio of the Ziegler-Natta catalyzed polyethylene resin to the LDPE resin is at least 20:1, preferably at least 10:1, preferably at least 9:1, preferably at least 8:1, preferably at least 7:1, preferably at least 6:1, preferably at least 5:1, preferably at least 4:1, preferably at least 3:1, for example at least 2:1, for example about 1:1.

65. The resin or article according to any one of statements 63 to 64, wherein the LDPE resin has a density of at least 0.910 to at most 0.940 g/cm$^3$, preferably of at least 0.915 to at most 0.935 g/cm$^3$, preferably of at least 0.920 to at most 0.930 g/cm$^3$, preferably of at least 0.922 to at most 0.928 g/cm$^3$.

66. The resin or article according to any one of statements 63 to 64, wherein the LDPE resin has a melt index MI2 of at least 0.1 to at most 5.0 g/10 min, preferably of at least 0.2 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.7 to at most 0.9 g/10 min.

67. The resin or article according to any of statements 1 to 57, further comprising a recycled polyethylene resin (rPE).

68. The resin or article according to statement 67, wherein the ratio of the Ziegler-Natta catalyzed polyethylene resin to the rPE resin is at least 20:1, preferably at least 10:1, preferably at least 9:1, preferably at least 8:1, preferably at least 7:1, preferably at least 6:1, preferably at least 5:1, preferably at least 4:1, preferably at least 31, for example at least 2:1, for example about 1:1.

69. The resin or article according to any one of statements 67 to 68, wherein the rPE resin has a density of at least 0.910 to at most 0.940 g/cm$^3$, preferably of at least 0.915 to at most 0.935 g/cm$^3$, preferably of at least 0.920 to at most 0.930 g/cm$^3$, preferably of at least 0.922 to at most 0.928 g/cm$^3$.

70. The resin or article according to any one of statements 67 to 69, wherein the rPE resin has a melt index MI2 of at least 0.1 to at most 5.0 g/10 min, preferably of at least 0.2 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.6 to at most 0.8 g/10 min.

71. The resin or article according to any one of statements 67 to 70, wherein the rPE resin comprises chromium-catalyzed polyethylene, preferably at least 50 wt % to at most 100 wt % of chromium-catalyzed polyethylene, as determined by NMR, with wt % based on the total weight of the rPE, preferably at least 60 wt % to at most 90 wt %.

72. The resin or article according to any one of statements 1 to 71, wherein at least 10% by weight and at most 30% by weight of the polyethylene resin elutes in TREF analysis between the temperatures of 45° C. and 90° C. calculated based on the total weight of crystallisable polymer fractions when determined using TREF analysis in the range of 35° C. to 120° C. at an elution rate of 1° C./min.

73. The resin or article according to any one of statements 1 to 72, wherein at least 15% by weight and at most 30% by weight of the polyethylene resin elutes in TREF analysis between the temperatures of 45° C. and 90° C., calculated based on the total weight of crystallisable polymer fractions when determined using TREF analysis in the range of 35° C. to 120° C. at an elution rate of 1° C./min; for example at least 16% and at most 30%, for example at least 17% and at most 30%, for example at least 18% and at most 30%, for example at least 19% and at most 30%.

74. The resin or article according to any one of statements 1 to 73, wherein at least 15% by weight and at most 25% by weight of the polyethylene resin elutes in TREF analysis between the temperatures of 45° C. and 90° C. calculated based on the total weight of crystallisable polymer fractions when determined using TREF analysis in the range of 35° C. to 120° C. at an elution rate of 1° C./min; for example at least 16% and at most 24%, for example at least 17% and at most 23%, for example at least 18% and at most 22%, for example at least 19% and at most 21%.

According to the first aspect, the present invention provides an injection stretch blow molded article, comprising a Ziegler-Naha catalyzed polyethylene resin, wherein the polyethylene resin has a multimodal molecular weight distribution. The specific combination of the selected parameters and the limited ranges in which they vary, provides an optimal balance between injection properties and stretch blow molding properties. The invention also encompasses the Ziegler-Natta catalyzed polyethylene resin which is used to prepare the injection stretch blow molded article.

The injection stretch blow molded article is preferably prepared with a composition comprising a Ziegler-Natta catalyzed polyethylene resin, said polyethylene resin comprising at least two polyethylene fractions A and B, fraction A having a higher molecular weight and a lower density than fraction B. The injection stretch blow molded article is preferably prepared with a composition comprising a Ziegler-Natta catalyzed polyethylene resin, said polyethylene resin comprising at least two polyethylene fractions A and B, fraction A having a higher molecular weight and a lower density than fraction B, each fraction being prepared in different reactors of at least two reactors connected in series. The injection stretch blow molded article is preferably prepared with a composition comprising a Ziegler-Natta catalyzed polyethylene resin having a multimodal molecular weight distribution, said polyethylene resin comprising at least two polyethylene fractions A and B, fraction A having a higher molecular weight and a lower density than fraction B, each fraction being prepared in different reactors of at least two reactors connected in series.

Preferably fraction A has a melt index HL275 of at least 11 g/10 min and of at most 20 g/10 min measured according to ISO 1133, condition G, at 190° C. and under a load of 21.6 kg except that a die of 2.75 mm was used. Preferably fraction A has a density of at least 941 kg/m$^3$ and of at most 946 kg/m$^3$ as determined according to ASTM 1505 at a temperature of 23° C. Preferably fraction A has a melt index HL275 of at least 11 g/10 min and of at most 20 g/10 min measured according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.

Preferably, the polyethylene resin has a melt index MI2 of at least 1.5 g/10 min and of at most 3.0 g/10 min as determined according to ISO 1133, condition D, at 190° C. and under a load of 2.16 kg. Preferably, the polyethylene resin has a density of at least 950 kg/m$^3$ and of at most 965 kg/m$^3$ measured according to ASTM 1505 at temperature 23° C. Preferably, the polyethylene resin has a melt index MI2 of at least 1.5 g/10 min and of at most 3.0 g/10 min as determined according to ISO 1133, condition D, at 190° C. and under a load of 2.16 kg and the polyethylene resin has a density of at least 950 kg/m$^3$ and of at most 965 kg/m$^3$ measured according to ASTM 1505 at temperature 23° C.

The injection stretch blow molded article is preferably prepared with a composition comprising a Ziegler-Natta catalyzed polyethylene resin having a multimodal molecular weight distribution, said polyethylene resin comprising at least two polyethylene fractions A and B, fraction A having a higher molecular weight and a lower density than fraction B, each fraction being prepared in different reactors of at least two reactors connected in series, wherein:

fraction A has a melt index HL275 of at least 11 g/10 min and of at most 20 g/10 min measured according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg and the polyethylene resin has a density of at least 950 kg/m$^3$ and of at most 965 kg/m$^3$ measured according to ASTM 1505 at temperature 23° C.

The term "polyethylene resin" as used herein refers to the polyethylene fluff or powder that is extruded, and/or melted and/or pelleted and can be produced through compounding and homogenizing of the polyethylene resin as taught herein, for instance, with mixing and/or extruder equipment.

The term "fluff" or "powder" as used herein refers to the polyethylene material with the hard catalyst particle at the core of each grain and is defined as the polymer material after it exits the polymerization reactor (or final polymerization reactor in the case of multiple reactors connected in series).

The polyethylene resin preferably has a multimodal molecular weight distribution. A multimodal polymer typically has different properties than a monomodal polymer (Practical Guide to Polyethylene, C. Vasile and M. Pascu, 2005, ISBN 1-85957-493-9, section 2.1.9 p. 20).

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin of the article can have has an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

The polyethylene resin preferably comprises at least two polyethylene fractions A and B, fraction A having a higher molecular weight and a lower density than fraction B. Preferably each fraction is prepared in different reactors of at least two reactors connected in series. In some preferred embodiments, fraction A is prepared in the first of the at least two reactors. In some embodiments, fraction B is prepared in the first of the at least two reactors. Since fractions A and B are prepared in different reactors, and fraction A has a higher molecular weight and a lower density than fraction B, the polyethylene resin will have at least two distinct but possibly overlapping populations of polyethylene macromolecules each having different weight average molecular weights. Hence, the polyethylene resin will be a multimodal resin. In some preferred embodiments, the polyethylene resin is a bimodal resin.

In an embodiment, the injection stretch blow molded article, comprising a Ziegler-Nat a catalyzed polyethylene resin has a bimodal molecular weight distribution.

The polyethylene resin having a multimodal, preferably bimodal, molecular weight distribution can be produced by polymerizing ethylene and one or more optional comonomers, optionally hydrogen, in the presence of a Ziegler-Natta catalyst system, in two or more reactors connected in series, preferably in two reactors connected in series.

As used herein, the term "catalyst" refers to a substance that causes a change in the rate of a polymerization reaction. In the present invention, it is especially applicable to catalysts suitable for the polymerization of ethylene to polyethylene. The present invention especially relates to Ziegler-Natta catalysts. The term "Ziegler-Natta catalyst" or "ZN catalyst" refers to catalysts having a general formula wherein $M^1$ is a transition metal compound selected from group IV to VII, wherein X is a halogen, and wherein v is the valence of the metal. Preferably. $M^1$ is a group IV, group V or group VI metal, more preferably titanium, chromium or vanadium and most preferably titanium. Preferably. X is chlorine or bromine, and most preferably chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference. A preferred Ziegler-Natta catalyst system comprises a titanium compound having at least one titanium-halogen bond and an internal electron donor, both on a suitable support (for example on a magnesium halide in active form), an organoaluminium compound (such as an aluminium trialkyl), and an optional external donor.

The type and particle size distribution of the catalyst typically has an effect on the properties of a polymer (Introduction to Industrial Polyethylene, D. B, Malpass, 2010, ISBN 978-0-470-62598-9, section 3.3 p. 36-38). Preferably, the Ziegler-Natta catalyst used for the preparation of the polyethylene resin has an average particle size (D50) of at most 20 μm. In some embodiments, the Ziegler-Natta catalyst has an average particle size distribution D50 of at least 5 μm. In some embodiments, the Ziegler-Natta catalyst has an average particle size distribution D50 of at least 5 μm and of at most 15 μm, preferably of at least 5 μm and of at most 12 μm and most preferably of at least 5 μm and of at most 9 μm.

The D50 is defined as the particle size for which fifty percent by volume of the particles has a size lower than the D50. The measurement of the average particle size (D50) can be made according to the International Standard ISO 13320:2009 ("Particle size analysis—Laser diffraction methods"). For example, Malvern Instruments' laser diffraction systems can advantageously be used. The D50 can be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

Particularly preferred catalyst for the preparation of the polyethylene resin, is a Ziegler-Natta catalyst system comprising a Ziegler-Natta catalyst component D and a preactivating agent, wherein the Ziegler Natta catalyst component D is obtainable by:

a) generating a reaction product A by contacting a magnesium dialkoxide compound with a halogenating agent;

b) contacting reaction product A with a first halogenating/titanating agent to f r reaction product B;

c) contacting reaction product B with a second halogenating/titanating agent to form reaction product C; and d) contacting reaction product C with a third halogenating/titanating agent to form catalyst component D.

Preferably the catalyst is made according to a process comprising the following steps: a) contacting a magnesium dialkoxide compound with a halogenating agent to form a reaction product A; b) contacting reaction product A with a first halogenating/titanating agent to form reaction product B; c) contacting reaction product B with a second halogenating/titanating agent to form reaction product C; and d) contacting reaction product C with a third halogenating/titanating agent to form reaction product D. The second and third halogenating/titanating agents can comprise titanium tetrachloride. The second and third halogenating/titanating steps can each comprise a titanium to magnesium ratio in the range of about 0.1 to 5. The reaction products A. B and C can each be washed with a hydrocarbon solvent prior to subsequent halogenating/titanating steps. The reaction product D can be washed with a hydrocarbon solvent until titanium species [Ti] content is less than about 100 mmol/L.

In an embodiment, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a pre-activation agent such as an organoaluminium.

One embodiment of the method for making a catalyst can be generally as follows:

1. $M^1RR'+2R''OH \rightarrow M^1(OR'')_2$
2. $M^1(OR'')_2+ClAR'''_x \rightarrow$ "A"
3. "A"+$TiCl_4/Ti(OR'''')_4 \rightarrow$ "B"
4. "B"+$TiCl_4 \rightarrow$ "C";
5. "C"+$TiCl_4 \rightarrow$ "D"
6. "D"+preactivating agent→catalyst.

In the above formulas, $M^1$ can be any suitable metal, usually a Group IIA metal, typically Mg. In the above formulas, R, R', R'', R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R'' generally comprises from 3 to 20 carbon atoms. R''' generally comprises from 2-6 carbon atoms, and R'''' generally comprises from 2-6 carbon atoms and is typically butyl. Any combination of two or more of R, R', R'', R''', and R'''' can be used, may be the same, or the combination of the R groups may be different from one another.

In the above embodiment comprising formula $ClAR'''_x$, A is a nonreducing oxyphilic compound which is capable of exchanging one chloride for an alkoxide. R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. No limiting examples of a chlorinating agent that can be used in the method are $ClTi(O^iPr)_3$ and $ClSi(Me)_3$.

The metal dialkoxide of the above embodiment is chlorinated to form a reaction product "A". While the exact composition of product "A" is unknown, it is believed that it contains a partially chlorinated metal compound, one example of which may be ClMg(OR'').

Reaction product "A" is then contacted with one or more halogenating/titanating agent, such as for example a combination of $TiCl_4$ and $Ti(OBu)_4$, to form reaction product "B". Reaction product "B" which is probably a complex of chlorinated and partially chlorinated metal and titanium compounds. Reaction product "B" can comprise a titanium impregnated $MgCl_2$ support and for example, may possibly be represented by a compound such as $(MCl_2)_y (TiCl_x (OR)_{4-x})_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by $(MCl_2)_y (TiCl_{x'}(OR)_{4-x'})_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by $(MCl_2)_y (TiCl_{x''}(OR)_{4-x''})_{z''}$. It is expected that the level of halogenation of "D" would be greater than that of product "C". This greater level of halogenation would produce a different complex of compounds. While this description of the reaction products offers the most probable explanation of the chemistry at this time, the method is not limited by this theoretical mechanism.

Metal dialkyls and the resultant metal dialkoxides suitable for use in the method can include any that can be utilized in the method to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesiumdialkyl.

In the practice of the method, the metal dialkoxide can be a magnesium compound of the general formula $Mg(OR'')_2$ where R'' is a hydrocarbyl or substituted hydrocarbyl of 1 to 20 carbon atoms.

The metal dialkoxide can be soluble and is typically non-reducing. A non-reducing compound has the advantage of forming $MgCl_2$ instead of insoluble species that can be formed by the reduction of compounds such as MgRR', which can result in the formation of catalysts having a broad particle size distribution. In addition, $Mg(OR'')_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di(2-ethylhexoxide), may be produced by reacting an alkyl magnesium compound (MgRR') with an alcohol (ROH), as shown below.

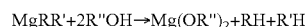

$MgRR'+2R''OH \rightarrow Mg(OR'')_2+RH+R'H$

The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the method, any alcohol yielding the desired metal dialkoxide may be utilized. Generally, the alcohol utilized may be any alcohol of the general formula R''OH where R'' is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the method will yield a suitable polyolefin catalyst. The halogenating step can be a chlorinating step where the halogenating agent contains a chloride (i.e, is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 12, and can also be about 1:1.

The halogenating step is generally carried out at a temperature in the range of about 0° C. to about 100° C. and for a reaction time in the range of about 0.5 to about 24 hours. The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as $TiCl_4$ or $Ti(OR'''')_4$. The halogenation/titanation agent utilized can be a chlorination/titanation agent.

The halogenation/titanation agent may be a single compound or a combination of compounds. The method provides an active catalyst alter the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of $TiCl_4$ and $Ti(OBu)_4$ in a range from 0.5:1 to 6:1 $TiCl_4/Ti(OBu)_4$, the ratio can be from 2:1 to 3:1 ("OBu" represents butoxide). It is believed that the blend of titanium halide and organic titanate react to form a titanium alkoxyhalide, $Ti(OR)_aX_b$, where OR and X are alkoxide and halide, respectively and a+b is the valence of titanium, which is typically 4.

In the alternative, the first halogenation/titanation agent may be a single compound. Examples of a first halogenation/titanation agent are $Ti(OC_2H_5)_3Cl$, $Ti(OC_2H_5)_2Cl_2$, $Ti(OC_3H_7)_2Cl_2$, $Ti(OC_3H_7)_3Cl$, $Ti(OC_4H_9)Cl_3$; $Ti(OC_6H_{13})_2 Cl_2$, $Ti(OC_2H_5)_2Br_2$, and $Ti(OC_{12}H_5)Cl_3$.

The first halogenation/titanation step is generally carried out by first slurrying the halogenation product "A" in a hydrocarbon solvent at room temperature/ambient temperature. No limiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5. An example is $TiCl_4$/titanium (IV) butoxide (TNBT).

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the method [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminium preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 5, preferably at least 6.

In general, the ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the preactivating agent. A prepolymerization process is described in U.S. Pat. No. 5,106,804; U.S. Pat. No. 5,153,158; and U.S. Pat. No. 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the method that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide $[MeSi(OEt)_3]$, where R and R' are alkyls with 1-5 carbon atoms and may be the same or different (wherein "OEt" represents "ethoxy"). For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the method can be selected from a silane compound of the following formula: wherein $R_1$ and $R_4$ are both an alkyl or cycloalkyl group containing a primary, secondary or tertiary carbon atom attached to the silicon. $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

Preferably, the preactivating agent is an organoaluminium compound, preferably of the formula $AlR_3$, wherein R is an alkyl having 1-8 carbon atoms or a halide, and wherein each R may be the same or different. More preferably, the organoaluminium compound is TEAL.

Preferably, the halogenating agent is $ClTi(OPr)_3$. Preferably, the first halogenating/titanating agent a mixture of $TiCl_4$ and $Ti(OBu)_4$, in a molar ratio range of from 0.5:1 to 6:1 of $TiCl_4/Ti(OBu)_4$. More preferably the molar ratio is 2:1 of $TiCl_4/Ti(OBu)_4$. Preferably, the second halogenating/titanating agent is $TiCl_4$. Preferably, the third halogenating/titanating agent is also $TiCl_4$.

Ziegler Natta catalyst having an average particle size (D50) of at most 15 μm can be prepared as described herein above. Other suitable Ziegler Natta catalysts of average particle size (D50) of at most 15 μm can be commercially available from Lyondellbasell such as Z 202 VS AVANT catalyst which has an average particle size of 13 μm.

Optionally, activating agent is used. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. No. 6,930,071 and U.S. Pat. No. 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50° k by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

In some embodiments, the injection stretch blow molded article, comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m³ and of at most 965 kg/m³;

and wherein the Ziegler-Natta catalyzed polyethylene resin was prepared in the presence of a Ziegler-Natta catalyst having an average particle size D50 of at least 5 μm and at most 20 μm, for example at least 3 μm and of at most 15 μm, preferably of at least 5 μm and of at most 12 μm and most preferably of at least 5 μm and of at most 9 μm.

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

According to the invention, the polyethylene resin preferably has a multimodal molecular weight distribution and comprises at least two polyethylene fractions A and B, fraction A having a higher molecular weight and a lower density than fraction B, wherein each fraction was prepared in different reactors of at least two reactors connected in series. The polyethylene resin is preferably obtained by operating the at least two reactors under different polymerization conditions.

The polyethylene resin is preferably prepared in two or more serially connected reactors, preferably loop reactors, more preferably slurry loop reactors, most preferably liquid full loop reactors in the presence of same or different Ziegler-Natta catalyst systems. The most preferred polymerization process is carried out in two serially connected slurry loop reactors, advantageously liquid full loop reactors i.e. a double loop reactor.

As used herein, the terms "loop reactor" and "slurry loop reactor" may be used interchangeably herein.

In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the at least one first and at least one second loop reactors may be connected through means such as a transfer line or one or more settling legs. In some embodiments, the first polyethylene fraction may be transferred from the first loop reactor to the second loop reactor through a transfer line. In some embodiments, the first polyethylene fraction may be discharged in batches, sequentially or continuously from the first loop reactor through one or more settling legs, and transferred to the second loop reactor via a transfer line.

In a preferred embodiment, the polyethylene resin is prepared in at least two loop reactors connected in series, preferably under slurry condition.

In some embodiments, the polyethylene resin having a multimodal molecular weight distribution is prepared using a process comprising the steps of:

(a) feeding ethylene monomer, a diluent, at least one Ziegler-Natta catalyst, optionally hydrogen, and optionally one or more olefin co-monomers into at least one first slurry loop reactor; polymerizing the ethylene monomer, and the optionally one or more olefin co-monomers, in the presence of the Ziegler-Natta catalyst, and optional hydrogen, in said first slurry loop reactor to produce a first polyethylene fraction;

(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the polyethylene resin. Preferably, the Ziegler-Natta catalyst has a particle size distribution d50 ranging from 5 μm to 20 μm.

In an preferred embodiment, the polyethylene resin has a bimodal molecular weight distribution and comprises two polyethylene fractions A and B, fraction A having a higher molecular weight and a lower density than fraction B, with each fraction being prepared in different reactors of two slurry loop reactors connected in series.

In some embodiments, the polyethylene resin having a bimodal molecular weight distribution is prepared using a process comprising the steps of:

(a) feeding ethylene monomer, a diluent, at least one Ziegler-Natta catalyst, optionally hydrogen, and optionally one or more olefin co-monomers into a first slurry loop reactor; polymerizing the ethylene monomer, and the optionally one or more olefin co-monomers, in the presence of the Ziegler-Natta catalyst, and optional hydrogen, in said first slurry loop reactor to produce a first polyethylene fraction;

(b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the polyethylene resin. Preferably, the Ziegler-Natta catalyst has a particle size distribution d50 ranging from 5 µm to 20 µm.

As used herein, the term "co-monomer" refers to olefin co-monomers which are suitable for being polymerized with ethylene monomers. Co-monomers may comprise but are not limited to aliphatic $C_3$-$C_{20}$ alpha-olefins. Examples of suitable aliphatic $C_3$-$C_{20}$ alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. Preferably, the co-monomer is 1-hexene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are isobutane, butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane.

The polyethylene resin comprised in the article preferably has a multimodal molecular weight distribution and comprises at least two polyethylene fractions A and B, fraction A having a higher molecular weight and a lower density than fraction B, each fraction prepared in different reactors of at least two reactors connected in series.

While preferably the fraction A can be produced in the first reactor and the fraction B is synthesized in the presence of fraction A in the second (loop) reactor serially connected to the first reactor, the opposite order is also possible. The molecular weight in each of the reactors can be regulated by known techniques such as varying the amount of hydrogen used.

In some embodiments, the polyethylene resin having a bimodal molecular weight distribution is prepared using a process comprising the steps of:

(a) feeding ethylene monomer, a diluent, at least one Ziegler-Natta catalyst, hydrogen, into a first slurry loop reactor; polymerizing the ethylene monomer, in the presence of the Ziegler-Natta catalyst, and hydrogen, in said first slurry loop reactor to produce a first polyethylene fraction;

(b) feeding the first polyethylene fraction to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the polyethylene resin. Preferably, the Ziegler-Natta catalyst has a particle size distribution d50 ranging from 5 µm to 20 µm.

In some preferred embodiments, the polyethylene resin having a bimodal molecular weight distribution is prepared using a process comprising the steps of:

(a) feeding ethylene monomer, a diluent, at least one Ziegler-Natta catalyst, optionally hydrogen, and one or more olefin co-monomers into a first slurry loop reactor; polymerizing the ethylene monomer, and the one or more olefin co-monomers, in the presence of the Ziegler-Natta catalyst, and optional hydrogen, in said first slurry loop reactor to produce a first polyethylene fraction A; and (b) feeding the first polyethylene fraction A to a second slurry loop reactor serially connected to the first slurry loop reactor, and in the second slurry loop reactor polymerizing ethylene, in the presence of the first polyethylene fraction A, and hydrogen, thereby producing the polyethylene resin comprising fraction A and a fraction B, wherein fraction A has a higher molecular weight and a lower density than fraction B. Preferably, the Ziegler-Natta catalyst has a particle size distribution d50 ranging from 5 µm to 20 µm.

In some preferred embodiments, the polyethylene resin having a bimodal molecular weight distribution is prepared using a process comprising the steps of:

(a) feeding ethylene monomer, a diluent, at least one Ziegler-Natta catalyst, optionally hydrogen, and 1-hexene comonomer into a first slurry loop reactor; polymerizing the ethylene monomer, and the 1-hexene in the presence of the Ziegler-Natta catalyst, and optional hydrogen in said first slurry loop reactor to produce a first polyethylene fraction A; and (b) feeding the first polyethylene fraction A to a second slurry loop reactor serially connected to the first slurry loop reactor, and in the second slurry loop reactor polymerizing ethylene, in the presence of the first polyethylene fraction A, and hydrogen, thereby producing the polyethylene resin comprising fraction A and a fraction B, wherein fraction A has a higher molecular weight and a lower density than fraction B. Preferably, the Ziegler-Natta catalyst has a particle size distribution d50 ranging from 5 µm to 20 µm. Preferably, a lower amount of hydrogen is used in the first reactor compared to the second reactor of the at least two reactors. Preferably a lower amount of co-monomer is added to the second reactor compared to the first reactor of the at least two reactors. Preferably no co-monomer is added to the second reactor of the at least two reactors.

Preferably low amount of hydrogen is used in the first loop reactor. Preferably no co-monomer is added to the second loop reactor.

The polymerization steps in the at least two loop reactors, i.e. in the first loop reactor and the second loop reactor, can be performed over a wide temperature range. In certain embodiments, the polymerization step in the first loop reactor and/or in the second loop reactor may be performed at a temperature from 20° C. to 125° C., preferably from 60° C. to 110° C., more preferably from 75° C. to 100° C. and most preferably from 78° C. to 98° C. Preferably, the temperature in the first loop reactor and in the second loop reactor range may be within the range from 75° C. to 100° C. and most preferably from 78° C. to 98° C.

In certain embodiments, the polymerization step in the first loop reactor and/or in the second loop reactor may be performed at a pressure from about 20 bar to about 100 bar, preferably from about 30 bar to about 50 bar, and more preferably from about 37 bar to about 45 bar.

In some embodiments, fraction A has a density of at least 941 kg/m³ and of at most 946 kg/m³, preferably of at least 941.5 kg/m³ and of at most 946 kg/m³, more preferably of at most 945.5 kg/m³, for example of at least 941.5 kg/m³ to at most 945.5 kg/m³, as measured according to ASTM 1505 at a temperature 23° C.

In some embodiments, fraction A has a melt index HL275 of at least 11 g/10 min, and of at most 20 g/10 min as measured according to ISO 1133 condition G at a temperature of 190° C. and under a load of 21.6 kg, except that a the of 2.75 mm broad was used. Most preferably, HL275 index is of at least 12 g/10 min and of at most 18 g/10 min. The HLMI can be calculated from the HL275 as follows: HLMI=HL275/32.

In an embodiment, fraction A is present in an amount ranging from at least 44% to at most 49% by weight based on the total weight of polyethylene resin; preferably ranging from 45% to 49%, for example from 46 to 49%, for example from 46% to 48%, for example from 46.5% to about 47.5% by weight based on the total weight of polyethylene resin.

For a bimodal polyethylene resin comprising two fractions A and B, the density of fraction B is linked to that of the density of fraction A by the following expression:

$$d = W_A * d_A + (1 - W_A) * d_B$$

wherein d is the density of the final polyethylene fluff, $W_A$ is the weight fraction of fraction A, $d_A$ is the density of fraction A, $d_B$ is the density of fraction B, and wherein the sum of both fractions A and B by weight ($W_A + W_B$) is 1. A similar formula can be expressed for any multimodal polyethylene resin comprising more than two fractions.

In an embodiment, fraction B has a density of at least 960 kg/m³, preferably of at least 965 kg/m³, for example of at least 970 kg/m³, for example of at least 972 kg/m³ as measured according to ASTM 1505 at a temperature 23° C.

For a bimodal polyethylene resin comprising two fractions A and B, the HLMI of fraction B is linked to that of the HLMI of fraction A by the following expression:

$$\text{Log } HLMI^{final} = W_A \times \text{Log } HLMI_A + W_B \times \text{Log } HLMI_B$$

wherein Log $HLMI^{final}$ is the Log HLMI of the final polyethylene fluff, $W_A$ is the weight fraction of fraction A, Log $HLMI_A$ is the Log HLMI of fraction A, Log $HLMI_B$ is the Log HLMI of fraction B, and wherein the sum of both fractions A and B by weight ($W_A + W_B$) is 1. A similar formula can be expressed for any multimodal polyethylene resin comprising more than two fractions.

In an embodiment, fraction B has a melt index MI2 of at least 20 g/10 min, and of at most 165 g/10 min as measured according to ISO 1133 condition D at a temperature of 190° C. and under a load of 2.16 kg. Preferably, MI2 index is of at least 30 g/10 min and of at most 100 g/10 min. Most preferably, MI2 index is of at least 50 g/10 min and of at most 100 g/10 min. Most preferably, MI2 index is of at least 60 g/10 min and of at most 80 g/10 min.

In some embodiments, the injection stretch blow molded article is prepared with a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min, preferably of at least 12 g/10 min and of at most 18 g/10 min, as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; preferably of at least 941.5 kg/m³ and of at most 946 kg/m³, more preferably of at most 945.5 kg/m³, for example of at least 941.5 kg/m³ to at most 945.5 kg/m³; and the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m³ and of at most 965 kg/m³; and preferably wherein fraction A is present in an amount ranging from at least 44% to at most 49% by weight based on the total weight of polyethylene resin; preferably ranging from 45% to 49%, for example from 46% to 49%, for example from 46% to 48%, for example from 46.5% to about 47.5% by weight based on the total weight of polyethylene resin.

The final polyethylene resin has a density of at least 950 kg/m³ and of at most 965 kg/m³, preferably of at least 952 kg/m³ and of at most 962 kg/m³, more preferably of at least 954 kg/m³ and of at most 962 kg/m³, more preferably of at least 955 kg/m³ and of at most 962 kg/m³, preferably of at least 957 kg/m³ and of at most 960 kg/m³, preferably of at least 958 kg/m³ and of at most 960 kg/m³. Density is measured according to ASTM 1505 at a temperature 23° C.

The final polyethylene resin has a melt index MI2 of at least 1.5 g/10 min and at most 3.0 g/10 min measured from the pellets. Preferably the melt index MI2 is of at least 1.5 and of at most 2.6 g/10 min, preferably the melt index MI2 is of at least 1.6 and of at most 2.5 g/10 min, preferably the melt index MI2 is of at least 1.7 and of at most 2.5 g/10 min, preferably the melt index MI2 is of at least 1.8 and of at most 2.4 g/10 min. The melt index MI2 was measured by the method of standard test ISO 1133, condition D, under a load of 2.16 kg and at a temperature of 190° C. Under normal production conditions in a production plant it is expected that the melt index MI2 will be higher for the fluff, and can be about 2.5 to about 3.6 g/10 min for the polyethylene fluff.

In some embodiments, the injection stretch blow molded article is prepared with a composition comprising a Ziegler-Natta catalyzed polyethylene resin having a multimodal molecular weight distribution and comprising at least two polyethylene fractions A and B, fraction A having a higher molecular weight and a lower density than fraction B, each fraction prepared in different reactors of at least two reactors connected in series, wherein:

fraction A has a melt index HL275 of at least 11 g/10 min and of at most 20 g/10 min, preferably of at least 12 g/10 min and of at most 18 g/10 min, as determined according to ISO 1133, condition G, at 190° C. and under a load of 21.6 kg except that a die of 2.75 mm was used; and a density of at least 941 kg/m³ and of at most 946 kg/m³ as determined according to ASTM 1505 at a temperature of 23° C.; preferably of at least 941.5 kg/m³ and of at most 946 kg/m³, more preferably of at most 945.5 kg/m³, for example of at least 941.5 kg/m³ to at most 945.5 kg/m³; and the polyethylene resin has a melt index MI2 of at least 1.5 g/10 min and of at most 3.0 g/10 min, preferably of at least 1.5 and of at most 2.6 g/10 min, preferably of at least 1.6 and of at most 2.5 g/10 min, preferably of at least 1.7 and of at most 2.5 g/10 min, preferably of at least 1.8 and of at most 2.4 g/10 min, as determined according to ISO 1133, condition D, at 190° C. and under a load of 2.16 kg; and a density of at least 950 kg/m³ and of at most 965 kg/m³, preferably of at least 952 kg/m³ and of at most 962 kg/m³, more preferably of at least 954 kg/m³ and of at most 962 kg/m³, more preferably of at least 955 kg/m³ and of at most 962 kg/m³, preferably of at least 957 kg/m³ and of at most 960 kg/m³, preferably of at least 958 kg/m³ and of at most 960 kg/m³; and preferably wherein fraction A is present in an amount ranging from at least 44% to at most 49% by weight based on the total weight of polyethylene resin; preferably ranging from 45% to 49%, for example from 46% to 49%, for example from 46% to 48%, for example from 46.5% to about 47.5% by weight based on the total weight of polyethylene resin.

In some embodiments, the molecular weight distribution MWD d (Mw/Mn) of the polyethylene resin (pellets) is preferably of at least 7 and of at most 11, preferably of at least 7.5 and of at most 10. In some embodiments, d' (Mz/Mw) of the polyethylene resin (pellets) is preferably of at least 4.5 and of at most 6.5. The molecular weight distribution d and d' are defined by the ratio Mw/Mn and Mz/Mw respectively where Mn (number average molecular weight), Mw (weight average molecular weight) and Mz (z-average molecular weight) are determined by gel permeation chromatography (GPC) as described in the Example section. Ideal molecular weight distribution increases polyethylene resin's processability and provides good mechanical properties.

In an embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min; and a density of at least 941 kg/m³ and of at most 946 kg/m³; and the polyethylene resin has a melt index MI2 of at least 1.5 g/10 min and of at most 3.0 g/10 min and a density of at least 950 kg/m³ and of at most 965 kg/m³.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min and a density of at least 941 kg/m³ and of at most 946 kg/m³ and the polyethylene resin has a melt index MI2 of at least 1.5 g/10 min to of at most 2.6 g/10 min and the polyethylene resin has a density of at least 950 kg/m³ and at most 965 kg/m³.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of two reactors connected in series, wherein: fraction A has a melt index HL275 of at least 11 g/10 min and of at most 20 g/10 min and a density of at least 941 kg/m³ and of at most 946 kg/m³ and the polyethylene resin has a melt index MI2 of at least 1.5 g/10 min and of at most 3.0 g/10 min and the polyethylene resin has a density of at least 955 kg/m³ and of at most 962 kg/m³.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a high load melt index HL275 of at least 11 g/10 min and of at most 20/10 min and a density of at least 941 kg/m³ and of at most 946 kg/m³ and the polyethylene resin has a melt index MI2 of at least 1.5 g/10 min and of at most 3.0 g/10 min and the polyethylene resin has a density of at least 958 kg/m³ and of at most 960 kg/m³.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of two reactors connected in series, wherein: fraction A has a melt index HL275 of at least 11 g/10 min and of at most 20 g/10 min and a density of at least 941 kg/m³ and of at most 946 kg/m³ and the polyethylene resin has a melt index MI2 of at least 1.5 g/10 min and of at most 3.0 g/10 min and the polyethylene resin has a density of at least 950 kg/m³ and of at most 965 kg/m³, and wherein fraction A is present in an amount ranging from 44 to 49% by weight based on the total weight of polyethylene resin; preferably ranging from 45 to 49%, for example from 46 to 49%, for example from 46 to 48%, for example from 46.5% to about 47.5% by weight based on the total weight of polyethylene resin.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min and a density of at least 941 kg/m³ and of at most 946 kg/m³ and the polyethylene resin has a melt index MI2 of at least 1.5 g/10 min and at most 3.0 g/10 min and the polyethylene resin has a density of at least 950 kg/m³ and of at most 965 kg/m³ and wherein Mw/Mn of the polyethylene resin is of at least 7 and of at most 11, preferably of at least 7.5 and of at most 10.

In another embodiment, the injection stretch blow molded article is prepared from a composition comprising a Ziegler-Natta catalyzed polyethylene resin, wherein the polyethylene resin has a bimodal molecular weight distribution and comprises two polyethylene fractions A and B, fraction A having a higher molecular weight and a lower density than fraction B, each fraction prepared in different reactors of two reactors connected in series, wherein: fraction A has a melt index HL275 of at least 12 g/10 min and of at most 18 g/10 min and a density of at least 941 kg/m³ and of at most 946 kg/m³ and the polyethylene resin has a melt index MI2 of at least 1.5 g/10 min and of at most 3.0 g/10 min and the polyethylene resin has a density of at least 950 kg/m³ and of at most 965 kg/m³, and wherein the polyethylene resin is prepared in slurry conditions.

In another embodiment, the injection stretch blow molded article is prepared from a composition comprising a Ziegler- Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two slurry loop reactors connected in series, wherein: fraction A has a melt index HL275 of at least 12 g/10 min and of at most 18 g/10 min and has a density of at least 941 kg/m$^3$ and of at most 946 kg/m$^3$ and the polyethylene resin has a melt index MI2 of at least 1.5 g/10 min and of at most 3.0 g/10 min and the polyethylene resin has a density of at least 950 kg/m$^3$ and of at most 965 kg/m$^3$.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and the polyethylene resin has a density of at least 950 kg/m$^3$ and of at most 965 kg/m$^3$.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and the polyethylene resin has a density of at least 955 kg/m$^3$ and of at most 962 kg/m$^3$.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and the polyethylene resin has a density of at least 958 kg/m$^3$ and of at most 960 kg/m$^3$.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 3.0 g/10 min and the polyethylene resin has a density of at least 955 kg/m$^3$ and of at most 962 kg/m$^3$.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 3.0 g/10 min and the polyethylene resin has a density of at least 958 kg/m$^3$ and at most 960 kg/m$^3$.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 3.0 g/10 min and the polyethylene resin has a density of at least 950 kg/m$^3$ and of at most 965 kg/m$^3$ and wherein fraction A is present in an amount ranging from 44 to 49% by weight based on the total weight of polyethylene resin; preferably ranging from 45 to 49%, for example from 46 to 49%, for example from 46 to 48%, for example from 46.5% to 47.5% by weight based on the total weight of polyethylene resin.

In another embodiment, the injection stretch blow molded article comprises a Ziegler-Natta catalyzed polyethylene resin, wherein the polyethylene resin has a bimodal molecular weight distribution and comprises two polyethylene fractions A and B, fraction A having a higher molecular weight and a lower density than fraction B, each fraction prepared in different reactors of two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 950 kg/m$^3$ and of at most 965 kg/m$^3$ and wherein fraction A is present in an amount ranging from 44 to 49% by weight based on the total weight of polyethylene resin; preferably ranging from 45 to 49%, for example from 46 to 49%, for example from 46 to 48%, for example from 46.5% to about 47.5% by weight based on the total weight of polyethylene resin.

In another embodiment, the injection stretch blow molded article is comprises a Ziegler-Natta catalyzed polyethylene resin, wherein the polyethylene resin has a bimodal molecular weight distribution and comprises two polyethylene fractions A and B, fraction A having a higher molecular weight and a lower density than fraction B, each fraction prepared in different reactors of two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 955 kg/m$^3$ and of at most 962 kg/m$^3$ and wherein fraction A is present in an amount ranging from 44 to 49% by weight based on the total weight of polyethylene resin; preferably ranging from 45 to 49%, for example from 46 to 49%, for example from 46 to 48%, for example from 46.5% to about 47.5% by weight based on the total weight of polyethylene resin.

In another embodiment, the injection stretch blow molded article comprises Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 958 kg/m$^3$ and of at most 960 kg/m$^3$, and wherein fraction A is present in an amount ranging from 44 to 49% by weight based on the total weight of polyethylene resin; preferably ranging from 45 to 49%, for example from 46 to 49%, for example from 46 to 48%, for example from 46.5% to 47.5% by weight based on the total weight of polyethylene resin.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and fraction A has a density of at least 941 kg/m$^3$ and of at most 946 kg/m$^3$ and the polyethylene resin has a melt index MI2 of at least 1.5 g/10 min and of at most 3.0 g/10 min and a density of at least 950 kg/m$^3$ and of at most 965 kg/m$^3$ and wherein fraction A is present in an amount ranging from 44 to 49%, by weight based on the total weight of polyethylene resin; preferably ranging from 45 to 49%, for example from 46 to 49%, for example from 46 to 48%, for example from 46.5% to 47.5% by weight based on the total weight of polyethylene resin.

In another embodiment, the injection stretch blow molded article is prepared from a composition comprising a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 955 kg/m$^3$ and of at most 962 kg/m$^3$ and wherein the polyethylene resin comprises about 47% by weight of fraction A by weight of polyethylene resin and wherein the Mw/Mn of the polyethylene resin is of at least 7 and of at most 11, preferably of at least 7.5 and of at most 10.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min and a density of at least 941 kg/m$^3$ and of at most 946 kg/m$^3$ and the polyethylene resin has a melt index MI2 of at least 1.5 g/10 min to of at most 3.0 g/10 min and the polyethylene resin has a density of at least 950 kg/m$^3$ and of at most 965 kg/m$^3$ and wherein the Ziegler-Natta catalyst has a particle size distribution D50 of from 5 to 20 μm.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 955 kg/m$^3$ and of at most 962 kg/m$^3$ and wherein fraction A is present in an amount ranging from 44 to 49% by weight based on the total weight of polyethylene resin; preferably ranging from 45 to 49%, for example from 46 to 49%, for example from 46 to 48%, for example from 46.5% to about 47.5% by weight based on the total weight of polyethylene resin and wherein the Ziegler-Natta catalyst has a particle size distribution D50 of from 5 to 15 μm.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 958 kg/m$^3$ and of at most 960 kg/m$^3$, and wherein fraction A is present in an amount ranging from 44 to 49% by weight based on the total weight of polyethylene resin; preferably ranging from 45 to 49%, for example from 46 to 49%, for example from 46 to 48%, for example from 46.5% to 47.5% by weight based on the total weight of polyethylene resin and wherein the Mw/Mn of the polyethylene resin is of at least 7 and of at most 11, preferably of at least 7.5 and of at most 10.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and fraction A has a density of at least 941 kg/m$^3$ and of at most 946 kg/m$^3$ and the polyethylene resin has a melt index MI2 of at least 1.5 g/10 min and of at most 2.6 g/10 min and a density of at least 955 kg/m$^3$ and of at most 962 kg/m$^3$, and wherein fraction A is present in an amount ranging from 44 to 49% by weight based on the total weight of polyethylene resin; preferably ranging from 45 to 49%, for example from 46 to 49%, for example from 46 to 48%, for example from 46.5% to 47.5% by weight based on the total weight of polyethylene resin and wherein the Mw/Mn of the polyethylene resin is of at least 7 and of at most 11, preferably of at least 7.5 and of at most 10.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 958 kg/m$^3$ of at most 960 kg/m$^3$, and wherein fraction A is present in an amount ranging from 44 to 49% by weight based on the total weight of polyethylene resin; preferably ranging from 45 to 49%, for example from 46 to 49%, for example from 46 to 48%, for example from 46.5% to 47.5% by weight based on the total weight of polyethylene resin and wherein the Mw/Mn is of the polyethylene resin is of at least 7 and of at most 11, preferably of at least 7.5 and of at most 10.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 12 g/10 min and of at most 18 g/10 min and a density of at least 941 kg/m$^3$ and of at most 946 kg/m$^3$ and the polyethylene resin has a melt index MI2 of at least 1.5 g/10 min and of at most 2.6 g/10 min and a density of at least 958 kg/m$^3$ and of at most 960 kg/m$^3$ and wherein the Mw/Mn of the polyethylene resin is of at least 7 and of at most 11, preferably of at least 7.5 and of at most 10.

In another embodiment, the injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min and a density of at least 941 kg/m$^3$ and of at most 946 kg/m$^3$ and the polyethylene resin has a melt index MI2 of at least 1.5 g/10 min to of at most 3.0 g/10 min and the polyethylene resin has a density of at least 950 kg/m$^3$ and of at most 965 kg/m$^3$ and the article is a container.

In another embodiment, an injection stretch blow molded article comprises a Ziegler-Natta catalyzed polyethylene resin, wherein the polyethylene resin has a multimodal molecular weight distribution and comprises at least two polyethylene fractions A and B, fraction A having a higher molecular weight and a lower density than fraction B, each fraction prepared in different reactors of at least two reactors connected in series, wherein: fraction A has a melt index HL275 of at least 11 g/10 min and of at most 20 g/10 min and a density of at least 941 kg/m$^3$ and of at most 946 kg/m$^3$ and the polyethylene resin has a melt index MI2 of at least 1.5 g/10 min to of at most 3.0 g/10 min and the polyethylene resin has a density of at least 950 kg/m$^3$ and of at most 965 kg/m$^3$ wherein the article is for packaging feed; food such as juices, dry products and dairy products; the packaging of cosmetics; detergents; lubricants; packaging of chemicals; agrochemicals; and pharmaceutical products.

Furthermore, in a preferred embodiment the injection stretch blow molded article comprises a Ziegler-Natta catalyzed polyethylene resin, wherein said polyethylene resin comprises a polyethylene fraction A having a density of at least 941.5 kg/m$^3$ and of at most 945.5 kg/m$^3$ and a melt index HL275 of at least 12 and of at most 18 g/10 min, and wherein the polyethylene resin has density of at least 956.5 kg/m$^3$ and of at most 961.5 kg/m$^3$ and a melt index MI2 of at most 1.7 g/10 min and of at most 2.5 g/10 min.

Yet, in another preferred embodiment, the injection stretch blow molded article comprises a Ziegler-Natta catalyzed polyethylene resin having a bimodal molecular weight distribution, wherein said polyethylene resin comprises a polyethylene fraction A having a density of at least 942.5 kg/m$^3$ and of at most 944.5 kg/m$^3$ and a melt index HL275 of at least 12.8 g/10 min and of at most 17.3 g/10 min, and wherein the polyethylene resin has a density of at least 958 kg/m$^3$ and at most 960 kg/m$^3$ and a melt index MI2 of at least 1.8 g/10 min and at most 2.4 g/10 min.

In some embodiments, the Ziegler-Natta catalyzed polyethylene resin has an environmental stress crack resistance measured with 100% Igepal CO-630 of at least 40 h, preferably at least 60 h, preferably, at least 80 h, more preferably at least 100 h.

The polyethylene resin may contain additives such as, by way of example, antioxidants, light stabilizers, acid scavengers, lubricants, antistatic additives, nucleating/clarifying agents, pigments, and colorants. An overview of such additives may be found in Plastics Additives Handbook, ed. H. Zweifel, 5th edition, 2001, Hanser Publishers.

The polyethylene resin comprised in the article has the advantage of providing a broad processing window, good process stability to prepare containers with good thickness repartition, good surface aspects, good finishing, high ESCR, high resistance impact, and a high top load. Thanks to stretching, it is possible to provide ISBM article of reduced weight (downgauging) while at least maintaining very good optical and mechanical properties (ESCR).

In some preferred embodiments, at least 10% by weight and at most 30% by weight of the polyethylene resin elutes in TREF analysis between the temperatures of 45° C. and 90° C., calculated on the total weight of crystallisable polymer fractions when determined using TREF analysis in the range of 35° C. to 120° C. at an elution rate of 1° C./min. A preferred detailed measurement method may be found in the example section below. More preferably, at least 15% by weight and at most 25% by weight of the polyethylene resin elutes in TREF analysis between the temperatures of 45° C. and 90° C., for example at least 16% and at most 24%, for example at least 17% and at most 23%, for example at least 18% and at most 22%, for example at least 19% and at most 21%.

The present invention also encompasses a process for preparing the injection stretch blow molded article. In an embodiment, the article can be injection stretch blow molded using a process which can either be a one-stage or a two-stage process. In a one-stage process injection molding of a preform and blowing of the preform to the final desired shape can be performed on the same machine, whereas in a two-stage process injection-molding of a preform and blowing of the preform can be conducted in different machines, which can be separated by a long distance. In an embodiment, the two-stage process comprises steps of cooling of the preform to ambient temperature and a subsequent reheating before the blowing step.

It has now been surprisingly found that under stretching and blowing conditions similar to those used for polyethylene terephthalate, containers with high rigidity, high ESCR (Environmental Stress-Cracking Resistance) and high impact resistance can be obtained.

The injection stretch blow molded article according to the present invention has improved mechanical behavior as compared to the same articles prepared with other resins or with other processing such as extrusion blow molding.

The present invention also encompasses a method for preparing the article, as well as the methods for preparing preforms, the preforms so obtained, the use of said preforms for preparing containers, and the containers prepared from said preforms.

In an embodiment, the preform, can have an open and a closed end, can be prepared by injection molding. The polyethylene resin can be fed to an extruder, plasticized and injected under pressure into an injection mold through an opening, generally referred to as "gate". The polyethylene resin can be injected into the injection mold at an injection temperature of at least 220° C., preferably of at least 230° C. The injection temperature can be of at most 300° C., preferably at most 290° C. and most preferably at most 280° C. The choice of injection temperature depends upon the melt flow index of the polyethylene resin. The injection mold can be filled at such a rate as to give a ratio of mold filing rate (in cm$^3$/s) over gate size (in mm) of 15 or less, preferably of 10 or less. The preform can be cooled inside the injection mold and removed from it. The ratio of mold filling rate over gate size can vary depending upon the viscosity of the molten polyethylene resin, for example, a more viscous molten polyethylene resin requires a lower value for the ratio than a more fluid molten polyethylene resin, no that a preform with good processing properties in the subsequent stretch-blowing steps will be obtained.

In an embodiment, the two-step process comprises the steps of:
providing a preform by injection molding on a mold, preferably on a multi-cavity mold;
cooling the preform to room temperature;
transporting the preform in the blow molding machine;
reheating the preform in the blow molding machine in a reflective radiant heat oven optionally, passing the heated preform through an equilibration zone to allow the heat to disperse evenly through the preform wall;
optionally, submitting the preform to a pre-blow step;
stretching the preform axially by a centre rod;
orienting the stretched preform radially by high pressure air.

In an embodiment, the one-step process comprises the steps of:
providing a preform by injection molding on a mold, preferably on a multi-cavity mold;
optionally slightly re-heating the preform;
optionally, passing the heated preform through an equilibration zone to allow the heat to disperse evenly through the preform wall;
optionally, submitting the preform to a pre-blow step;
stretching the preform axially by a centre rod;
orienting the stretched preform radially by high pressure air.

In a one-stage process the preform can be cooled to a temperature in the range from 90° C. to 140° C. and can be stretch blown into a container. All of these steps can be performed on a single machine.

In a two-stage process the preform can be allowed to cool to ambient temperature and transported to a different machine. The preforms can be uniformly reheated to a temperature below the polyethylene's melting point. The reheating can be followed by an equilibration step. Subsequently, the preform can be transferred to the stretch-blowing zone and secured within the blowing mold, which has the same shape as the final container, in such a way that the closed end of the preform points to the inside of the blowing mold. The preform can be stretched axially with a center rod, generally referred to as "stretch rod" to bring the wall of the perform against the inside wall of the blowing mold. The stretch rod speed can go up to 2000 mm/s. Preferably it is in the range from 100 mm/s to 2000 mm/s, and more preferably in the range from 500 mm/s to 1500 mm/s. Pressurized gas can be used to radially blow the preform into the blowing mold shape. The blowing can be done using gas with a pressure in the range from 5 bars to 40 bars, and preferably from 10 bars to 30 bars.

The blowing of the preform can also be performed in two steps, by first pre-blowing the preform with a lower gas pressure, and then blowing the preform to its final shape with a higher gas pressure. The gas pressure in the pre-blowing step can be in the range from 2 bars to 10 bars, preferably in the range from 4 bars to 6 bars. The preform can be blown into its final shape using gas with a pressure in the range from 5 bars to 40 bars, more preferably from 10 bars to 30 bars, and most preferably from 15 bars to 25 bars.

Following the stretching and blowing, the container is rapidly cooled and removed from the blowing mold.

The containers obtained by the injection stretch blow molding process of the present invention can be characterized by good impact properties in combination with high rigidity and high ESCR.

The present invention also encompasses the injection stretch blow molded container, wherein the container weighs from 10 to 150 g per dm$^3$ of volume.

In some embodiments, the injection stretch blow molded container weighs from 10 to 150 g/dm$^3$ of volume, when the container has a volume of less than 30 dm$^3$, preferably the container weighs from 10 to 80 g/dm$^3$ of volume, when the container has a volume of at least 30 dm$^3$.

The articles prepared according to the present invention can be hollow containers and bottles that can be used in various food and non-food applications, in particular for consumer packaging. The food applications comprise in particular the storage of juices, dry products and dairy products. The non-food applications comprise in particular the storage of cosmetic, detergents, lubricants, chemicals, agrochemical, and pharmaceutical products.

In some embodiments, the injection stretch blow molded article does not only comprise the Ziegler-Natta catalyzed polyethylene resin as described above, but also comprises an additional polyethylene resin. The Ziegler-Natta catalyzed polyethylene resin and the additional polyethylene resin may be blended, through a physical blend or a chemical blend. Preferably, the Ziegler-Natta catalyzed polyethylene resin and the additional polyethylene resin form a physical blend, for example the blend was prepared by blending the Ziegler-Natta catalyzed polyethylene resin and the additional polyethylene resin in an extruder.

In some preferred embodiments, the ratio of weight of the Ziegler-Natta catalyzed polyethylene resin to the additional polyethylene resin is at least 20:1, preferably at least 10:1, preferably at least 9:1, preferably at least 8:1, preferably at least 7:1, preferably at least 6:1, preferably at least 51, preferably at least 4:1, preferably at least 3:1, for example at least 2:1, for example about 1:1.

In some preferred embodiments, the additional polyethylene resin is a chromium-catalyzed polyethylene resin, preferably with a density of at least 0.950 to at most 0.965 g/cm$^3$ and a melt index MI2 of at least 0.1 to at most 5.0 g/10 min. In some preferred embodiments, the chromium-catalyzed polyethylene resin has a density of at least 0.952 to at most 0.965 g/cm$^3$, preferably of at least 0.954 to at most 0.964 g/cm$^3$, preferably of at least 0.956 to at most 0.964 g/cm$^3$, preferably of at least 0.958 to at most 0.963 g/cm$^3$, preferably of at least 0.960 to at most 0.963 g/cm$^3$. In some preferred embodiments, the chromium-catalyzed polyethylene resin has a melt index MI2 of at least 02 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.7 to at most 0.9 g/10 min. In some preferred embodiments, the ratio of weight of the Ziegler-Natta catalyzed polyethylene resin to the chromium-catalyzed polyethylene resin is at least 20:1, preferably at least 10:1, preferably at least 9:1, preferably at least 8:1, preferably at least 7:1, preferably at least 6:1, preferably at least 5:1, preferably at least 4:1, preferably at least 3:1, for example at least 2:1, for example about 1:1.

In some preferred embodiments, the additional polyethylene resin is an LDPE resin. In some preferred embodiments, the LDPE resin has a density of at least 0.910 to at most 0.940 g/cm$^3$, preferably of at least 0.915 to at most 0.935 g/cm$^3$, preferably of at least 0.920 to at most 0,930 g/cm$^3$, preferably of at least 0.922 to at most 0,928 g/cm$^3$. In some preferred embodiments, the LDPE resin has a melt index MI2 of at least 0.1 to at most 5.0 g/10 min, preferably of at least 0.2 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.7 to at most 0.9 g/10 min. In some preferred embodiments, the ratio of weight of the Ziegler-Natta catalyzed polyethylene resin to the LDPE resin is at least 20:1, preferably at least 10:1, preferably at least 9:1, preferably at least 8:1, preferably at least 7:1, preferably at least 6:1, preferably at least 5:1, preferably at least 4:1, preferably at least 3:1, for example at least 2:1, for example about 1:1.

In some preferred embodiments, the additional polyethylene resin is rPE (recycled polyethylene) resin. In some preferred embodiments, the rPE resin has a density of at least 0.910 to at most 0.940 g/cm$^3$, preferably of at least 0.915 to at most 0.935 g/cm$^3$, preferably of at least 0.920 to at most 0.930 g/cm$^3$, preferably of at least 0.922 to at most 0.928 g/cm$^3$. In some preferred embodiments, the rPE resin has a melt index MI2 of at least 0.1 to at most 5.0 g/10 min, preferably of at least 0.2 to at most 4.0 g/10 min, preferably of at least 0.3 to at most 3.0 g/10 min, preferably of at least 0.4 to at most 2.0 g/10 min, preferably of at least 0.5 to at most 1.5 g/10 min, preferably of at least 0.6 to at most 1.0 g/10 min, preferably of at least 0.6 to at most 0.8 g/10 min.

In some preferred embodiments, the rPE comprises chromium-catalyzed polyethylene. Preferably, the rPE comprises at least 50 wt % to at most 100 wt % of chromium-catalyzed polyethylene, as determined by NMR, with wt % based on the total weight of the rPE, preferably at least 60 wt % to at most 90 wt %. In some preferred embodiments, the ratio of weight of the Ziegler-Natta catalyzed polyethylene resin to the rPE resin is at least 20:1, preferably at least 10:1, preferably at least 9:1, preferably at least 8:1, preferably at least 7:1, preferably at least 6:1, preferably at least 5:1, preferably at least 4:1, preferably at least 3:1, for example at least 2:1, for example about 1:1.

EXAMPLES

The present examples further illustrate to the person skilled in the art some specific ways in which the invention may be carried out.

Test Methods:

The density was measured according to the method of standard ASTM 1505 at a temperature of 23° C.

The melt index MI2 was measured according to the method of standard ISO 1133, condition D, at 190° C. and under a load of 2.16 kg.

High load melt index HLMI was measured according to the method of standard ISO 1133, condition G, at 190° C. and under a load of 21.6 kg.

The melt index MI5 was measured according to the method of standard ISO 1133, condition T, at 190° C. and under a load of 5 kg.

HL275 was measured according to the method of standard ISO 1133, condition G, at 190° C. and under a load of 21.6 kg except that a die of 2.75 mm was used.

ESCR was measured according to ASTM D 1693 at 50° C. using 10% and 100% Igepal CO-630 as a chemical agent (wherein Igepal CO-630 (CAS Number 68412-54-4) is commercially available from Rhodia).

Charpy impact strength was measured according to ISO 179 at 23° C.

The molecular weight ($M_n$ (number average molecular weight), $M_w$ (weight average molecular weight) and molecular weight distributions d (Mw/Mn), and d' (Mz/Mw) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})$=0.965909−$\log_{10}(M_{PS})$−0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i / M_i} = \frac{\sum_i h_i}{\sum_i h_i / M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Top load strength and bumper compression strength provide information about the crushing properties of an ISBM article when employed under crush test conditions. Load capacity of rigid containers was measured using the Agr·TopWave® TopLoad Tester (Agr International, Inc.) which uses a large compression plate and a counterforce subassembly (spring). Tests of the top load and bumper compression strength are carried out by placing the ISBM article on a lower plate (vertically for top load strength and horizontally for bumper compression). The load plate is moved downward with a speed of 0.52 inch/min into contact with the bottle finish and the pressure is progressively increased until the bottle starts to be deformed. At the first deformation of the bottle the load plate returns to its initial position.

Haze was measured according to ASTM D 1003, procedure "A" using BYK Gardner Hazegard Plus System. The sample is prepared by first cutting the sample into a manageable size using scissors or a razor blade from larger main sample. Haze is the percentage of transmitted light that deviates from the incident beam by more than 2.5° on the average.

Gloss was measured according to ASTM D-2457 using a BYK Gardner micro-gloss Glossmeter at an angle of 45° in accordance with a method based on ASTM D-2457-70.

TREF analysis was performed using the method similar to as described in Soares and Hamielec. Polymer, 36 (8), 1995 1639-1654, incorporated herein in its entirety by reference. The TREF analysis was performed on a DEMO 200 TF instrument equipped with IR4 detector from Polymer Char. The samples were dissolved in 1,2-dichlorobenzene at 150° C. for 1 h, detector (DRI differential refractive index). The following parameters as shown in Table A were used.

TABLE A

| | |
|---|---|
| Dissolution Rate (° C./min) | 40 |
| Stabilization Rate (° C./min) | 40 |
| Crystallization Rate 1 (° C./min) | 0.5 |
| Elution Rate (° C./min) | 1 |
| Cleaning rate (° C./min) | 30 |
| Dissolution temperature (° C.) | 150 |
| Stabilization temperature (° C.) | 95 |
| Crystallization temperature (° C.) | 35 |
| Elution init temp (° C.) | 35 |
| Elution temperature (° C.) | 120 |
| Post elution temperature (° C.) | 150 |
| Cleaning temperature (° C.) | 150 |
| Dissolution time (min) | 60 |
| Stabilization time (min) | 45 |
| Crystallization time (min) | 10 |
| Pre-injection time (min) | 10 |
| Soluble Fraction time (min) | 10 |
| post elution time (min) | 10 |
| Cleaning time (min) | 30 |
| Cleaning cycles | 1 |
| High rpm | 200 |
| Low rpm | 100 |
| T on | 5 |
| T off (s) | 120 |
| Dissolution stirring | High |
| Stabilization stirring | High |
| Cleaning stirring | High |

TABLE A-continued

| | |
|---|---|
| Filling vessels volume | 20 |
| Filling vessels pick up speed | 40 |
| Filling vessels pump speed | 15 |
| Analysis discarded sample volume | 2 |
| Analysis discarded waste volume | 6 |
| Analysis sample volume | 0.3 |
| Column load volume | 1.9 |
| Analysis waste volume | 5 |
| Analysis returned volume | 1 |
| Analysis pick up rate | 8 |
| Analysis dispensing rate | 3 |
| Cleaning volume | 30 |
| Cleaning pick up speed | 40 |
| Cleaning pump speed | 15 |
| Top oven temperature | 140 |
| Pump Flow (ml/min) | 0.5 |

Example A

Polyethylene resin 1 (Example 1) was prepared in a double loop reactor comprising 2 reactors Rx1 and Rx2 connected in series. Polymerization were carried at a temperature of 92° C. under a pressure of about 40 bars with a residence time of about 54 minutes in Rx1 and at a temperature of 95° C. under a pressure of about 40 bars with a residence time of about 32 minutes in Rx2 using a Ziegler-Natta catalyst system having a D50 of 8.2 µm, comprising 14% Magnesium (dry basis), Aluminium 2.4% and Chlorine 57% prepared as described in the detailed description.

The reactors' operating conditions and properties of the resin are shown in Table 1.

TABLE 1

| | | | Example 1 |
|---|---|---|---|
| CATALYST | | (type) | Ziegler Natta |
| | Conc. | [g/Liter] | 10.0 |
| | temperature | (° C.) | 92.0 |
| Rx 1 | C2- | (kg/h) | 20 |
| OPERATING | Comonomer | (Type) | 1-Hexene |
| CONDITIONS | Comonomer | (Kg/h) | 0.969 |
| | H2 | (Nl/h) | 27.1 |
| | IC4 | (kg/h) | 65 |
| Rx 1 | C2- | (wt %) | 1.02 |
| OFF-GAS | C6- | (wt %) | 1.23 |
| | H2 | (wt %) | 0.043 |
| | C6-/C2- | | 1.20 |
| | Contribution | (wt %) | 47.1 |
| Rx1 | HL275 | (g/10 min) | 16 |
| ANALYTICAL | Density | (g/cm³) | 0.9426 |
| RESULTS | | | |
| Rx2 | Temperature | (° C.) | 95.0 |
| OPERATING | C2- | (kg/h) | 25.0 |
| CONDITIONS | 1-hexene | (kg/h | 0 |
| | H2 | (Nl/h) | 1168.7 |
| | IC4 | (kg/h) | 45 |
| Rx2 | C2- | (wt %) | 3.45 |
| OFF-GAS | C2+ | (wt %) | 0.30 |
| | C6- | (wt %) | 0.69 |
| | H2 | (vol %) | 1.716 |
| | C6-/C2- | | 0.20 |
| Rx2 | MI2 | (g/10 min) | 2.0 |
| ANALYTICAL | MI5 | (g/10 min) | 7.1 |
| RESULTS | HLMI | (g/10 min) | 117.6 |
| | SR2 | | 60 |
| | Density | (g/cm³) | 0.9597 |
| FLUFF | MI2 | (g/10 min') | 2.1 |
| ANALYTICAL | MI5 | (g/10 min) | 7.5 |
| RESULTS | HLMI | (g/10 min) | 123 |
| | SR2 | | 59 |

TABLE 1-continued

|   |   |   | Example 1 |
|---|---|---|---|
|  | SR5 |  | 16.4506 |
|  | Density | (g/cm³) | 0.9596 |
|  | MI2 | (g/10 min) | 1.7880 |
|  | MI5 | (g/10 min) | 7 |
| PELLETS | HLMI | (g/10 min) | 113.186 |
| ANALYTICAL | SR2 |  | 63.49495473 |
| RESULTS | SR5 |  | 17.2313993 |
|  | Density | (g/cm³) | 0.95986 |

Example B

A fluff prepared as described in Example A, was pelleted in the presence of antioxidants to give pellets Example 2.

Comparative example 1 is a polyethylene resin produced in the presence of a metallocene catalyst. Comparative example 2 is a polyethylene resin having a bimodal molecular weight distribution produced in two serially connected slurry loop reactors using a Ziegler-Natta catalyst system.

The properties of the resins are given in Table 2.

TABLE 2

| Grade |  | Pellets Example 2 | Comparative example 1 | Comparative example 2 |
|---|---|---|---|---|
| DENSITY | (kg/m³) | 958.5 | 958 | 958 |
| MI-2 | (g/10 min) | 1.76 | 7.8 | 0.3 |
| MI-5 | (g/10 min) | 6.01 |  |  |
| HLMI | (g/10 min) | 96.4 | 173.5 | 30.1 |
| GPC | Mn (g/mol) | 11084 | 19363 | 11904 |
|  | Mw (g/mol) | 107910 | 54548 | 162481 |
|  | Mz (g/mol) | 653955 | 101876 | 951002 |
|  | d(—) | 9.7 | 2.8 | 13.6 |
|  | d'(—) | 6.1 | 1.9 | 5.9 |
| ESCR | 10% F50(h) | 18 |  |  |
| ESCR | 100% F50(h) | 98 | 22 | >400 |
| Charpy impact strength | 23° C. (kJ/m²) | 5.49 |  |  |

Non-isothermal tests that simulated the injection molding process have been used for evaluating resin processability in injection molding processes. In these tests, the rheological, crystallization and thermal properties of polymers were taken into account. The spiral flow test comprised measuring the spiral flow length before freeze-up of melted polymer injected into a standard mold under standard filling conditions.

A standard moldability test has been carried out. Melted polymer was injected into a standard mold having a simple spiral geometry involving a long flow path. The moldability index was defined as the flow length, meaning the length of mold filled before freeze-up under standard filling conditions. The spiral flow lengths (SFL) have been measured at a temperature of 240° C. and respectively under injection pressures of 500, 800 and 1100 bars: they were respectively of 201, 292 and 372 mm for example 2. Spiral flow was determined on a 60 ton Netstal injection molding machine with a screw having a diameter of 32 mm and a L/D ratio of 25. The injection pressure has been varied. Spiral flow lengths (SFL) for several resins have been reported as a function of increasing injection pressure at a temperature of 240° C. and are shown in FIG. 1.

The spiral flow lengths (SFL) of comparative example 2 have been measured at a temperature of 240° C. and respectively under injection pressures of 500, 800 and 1100 bars: they were respectively, 129, 198 and 261 mm.

The spiral flow lengths (SFL) of comparative example 1 have been measured at a temperature of 240° C. and respectively under injection pressures of 500, 800 and 1100 bars: they were respectively, 220, 298, 365 mm.

Example C

A preform (23 g) was injected with a pelleted polyethylene resin prepared as described in Example A, having density of 0.957 g/cm³ and HLMI 121.7 g/10 min.

The conditions used for the injections are given in Table 3. Injection molder and stretch blow molder machines used were as follows: Injection molder 80 Ton Netstal—tooling mold base Husky preform; Stretch blow molder (SBM) ADS G62 PPO1 linear stretch blow molder—tooling 2-cavity 500 ml bottle.

TABLE 3

| Barrel temperature (° C.) | 250 |
|---|---|
| Hot runner temperature (° C.) | 200 |
| Mold temperature (Static/move) (° C.) | 23.9/29.4 |
| Injection speed (mm/s) | 5 |
| Cycle time (s) | 48.36 |

The surface aspect of the preform was studied and the preform presented no significant marks.

The conditions used for the stretching/blowing are given in Table 4.

TABLE 4

| Output rate (bottles per hours) | 3000 |
|---|---|
| Pre-blowing (bar) | 5 |
| Blowing (bar) | 20 |

The present polyethylene allowed preparing injection stretch blow molded articles with a smooth, stable and high throughput process.

The bottle properties are given in Table 5.

TABLE 5

| Top load | Displacement at Yield, in | 0.157 |
|---|---|---|
|  | Displacement at Yield standard deviation | 0.0036 |
|  | Maximum load (N) | 179 |
|  | Maximum load standard deviation | 12 |
|  | Failure area | 2 at bottom |
|  |  | 3 at top |
|  | Gloss at 45° | 46.2% |
|  | Haze | 32.5% |

Gloss 45 was measured according to ASTM D-2457 at an angle of 45°.

Haze was measured according to ASTM D 1003.

Bottles according to the invention have the advantage of having high gloss, high transparency, good surface aspect, good thickness repartition, high bottle stress crack resistance, high impact properties, and high topload.

Example D

A fluff prepared as described in Example A, was pelleted in the presence of antioxidants to give pellets Example 3.

The properties of the pellets Example 3 are given in Table 6.

TABLE 6

| Grade (pellets) | | Pellets Example 3 |
| --- | --- | --- |
| DENSITY | (kg/m$^3$) | 958 |
| MI-2 | (g/10 min) | 1.9 |
| HLMI | (g/10 min) | 105 |
| ESCR | 100% F50 (h) | 130 |
| GPC | Mn (g/mol) | 12000 |
| | Mw (g/mol) | 100000 |
| | Mz (g/mol) | 640000 |
| | d (—) | 8.7 |
| | d' (—) | 6.2 |

Blends were prepared which comprised pellets Example 3 and a chromium-catalyzed polyethylene resin. In this example, it is demonstrated that the addition of a chromium-catalyzed polyethylene resin to bimodal Ziegler-Natta-catalyzed polyethylene resin allows preparing blends having improved blowability with a similar injectability in comparison with 100% Ziegler-Natta-catalyzed polyethylene resin.

The chromium-catalyzed polyethylene resin used was HDPE 2008 SN 60, a high density polyethylene (HDPE) pellet grade containing antioxidants commercially available from TOTAL Refining & Chemicals. The properties of HDPE 2008 SN 60 are shown in Table 7.

TABLE 7

| Grade (pellets) | | HDPE 2008 SN 60 |
| --- | --- | --- |
| DENSITY | (kg/m$^3$) | 963 |
| MI-2 | (g/10 min) | 0.7 |
| HLMI | (g/10 min) | 50 |
| ESCR | 100% F50 (h) | 11 |
| GPC | Mn (g/mol) | 14000 |
| | Mw (g/mol) | 110000 |
| | Mz (g/mol) | 795000 |
| | d (—) | 7.5 |
| | d' (—) | 7.4 |

Different blends were produced on a Brabender extruder:
Blend 1: 100 wt % of pellets example 3 (reference)
Blend 2: 10 wt % of HDPE 2008 SN 60+90 wt % of pellets example 3
Blend 3: 25 wt % of HDPE 2008 SN 60+75 wt % of pellets example 3
The properties of the blends are shown in Table 8:

TABLE 8

| Grade (pellets) | | Blend 1 | Blend 2 | Blend 3 |
| --- | --- | --- | --- | --- |
| DENSITY | (kg/m$^3$) | 959 | 959 | 960 |
| MI-2 | (g/10 min) | 1.7 | 1.7 | 1.6 |
| HLMI | (g/10 min) | 95 | — | 80 |
| ESCR | 100% F50 (h) | — | — | — |
| GPC | Mn (g/mol) | 11500 | 11800 | 12000 |
| | Mw (g/mol) | 100000 | 100000 | 100000 |
| | Mz (g/mol) | 590000 | 590000 | 620000 |
| | d (—) | 8.9 | 8.7 | 8.5 |
| | d' (—) | 5.7 | 5.8 | 6 |

Figure 2:
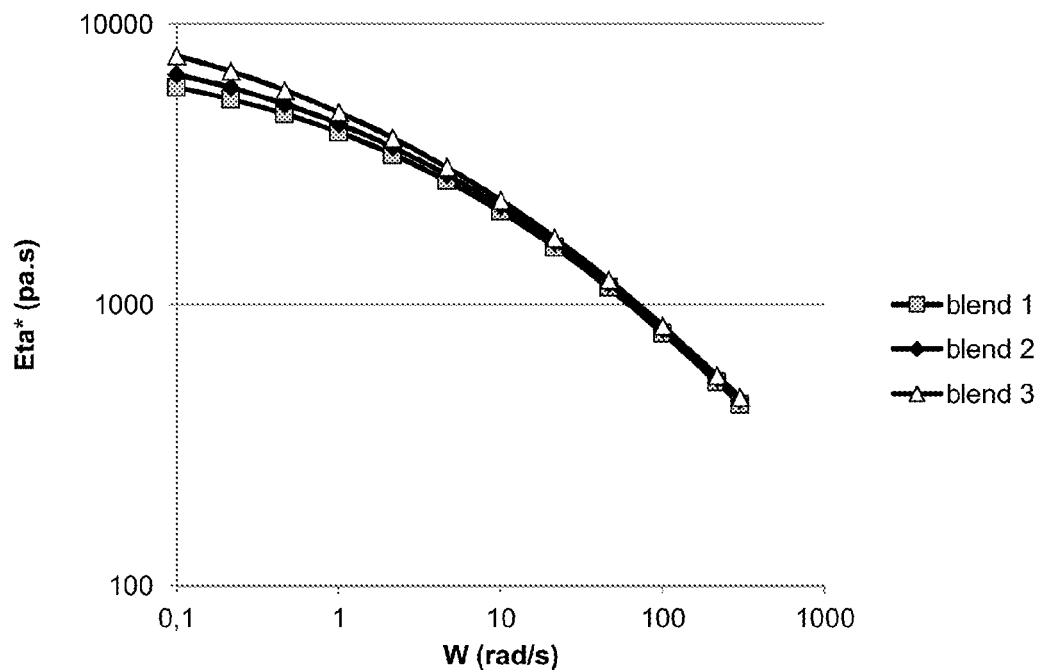
FIG. 2 represents a rheometric dynamic analysis ("RDA") graph plotting viscosity as a function of shear rate for three different polyethylene blends according to embodiments of the present invention.

Dynamic rheometry analyses (RDA) were performed on the different blends. The RDA experiment was performed on an ARES rheometer from TA Instruments (Waters SA), measured on parallel plates with a diameter of 25 mm. Temperature was 190° C., deformation was 10%, and the scanning frequency was from 0.1 to 300 rad/s. The results are shown in FIG. 2.

The addition of chromium-catalyzed polyethylene grade to a bimodal Ziegler-Natta-catalyzed polyethylene grade gave a blend having an improved blowability (=higher viscosity at low shear rate) with a similar injectability (=low viscosity at high shear rate).

Example E

Blends were prepared which comprised pellets Example 3 (described in example D) and a low density polyethylene resin (LDPE). In this example, it is demonstrated that the addition of a LDPE to a bimodal Ziegler-Natta-catalyzed polyethylene resin allows preparing blends having improved blowability with a similar injectability in comparison with 100% Ziegler-Natta-catalyzed polyethylene resin.

The LDPE used was LDPE FE 8000, a low density polyethylene produced by a high pressure autoclave process commercially available from TOTAL Refining & Chemicals. The properties of LDPE FE 8000 are shown in Table 9.

TABLE 9

| Grade (pellets) | | LDPE FE 8000 |
| --- | --- | --- |
| DENSITY | (kg/m$^3$) | 924 |
| MI-2 | (g/10 min) | 0.8 |
| HLMI | (g/10 min) | 52 |
| ESCR | 100% F50 (h) | |
| GPC | Mn (g/mol) | 17000 |
| | Mw (g/mol) | 95000 |
| | Mz (g/mol) | 330000 |
| | d (—) | 5.7 |
| | d' (—) | 3.5 |

Different blends were produced on a Brabender extruder:
Blend 1: 100 wt % of pellets example 3 (reference)
Blend 4: 10 wt % of LDPE FE 8000+90 wt % of pellets example 3
Blend 5: 25 wt % of LDPE FE 8000+75 wt % of pellets example 3
The properties of the blends are shown in Table 10:

TABLE 10

| Grade (pellets) | | Blend 1 | Blend 4 | Blend 5 |
| --- | --- | --- | --- | --- |
| DENSITY | (kg/m$^3$) | 959 | 957 | 950 |
| MI-2 | (g/10 min) | 1.7 | 1.8 | 1 |
| HLMI | (g/10 min) | 95 | 81 | 72 |
| ESCR | 100% F50 (h) | — | — | — |
| GPC | Mn (g/mol) | 11500 | 12000 | 12500 |
| | Mw (g/mol) | 100000 | 100000 | 100000 |
| | Mz (g/mol) | 590000 | 560000 | 520000 |
| | d (—) | 8.9 | 8.5 | 8.1 |
| | d' (—) | 5.7 | 5.5 | 5.2 |

Figure 3:
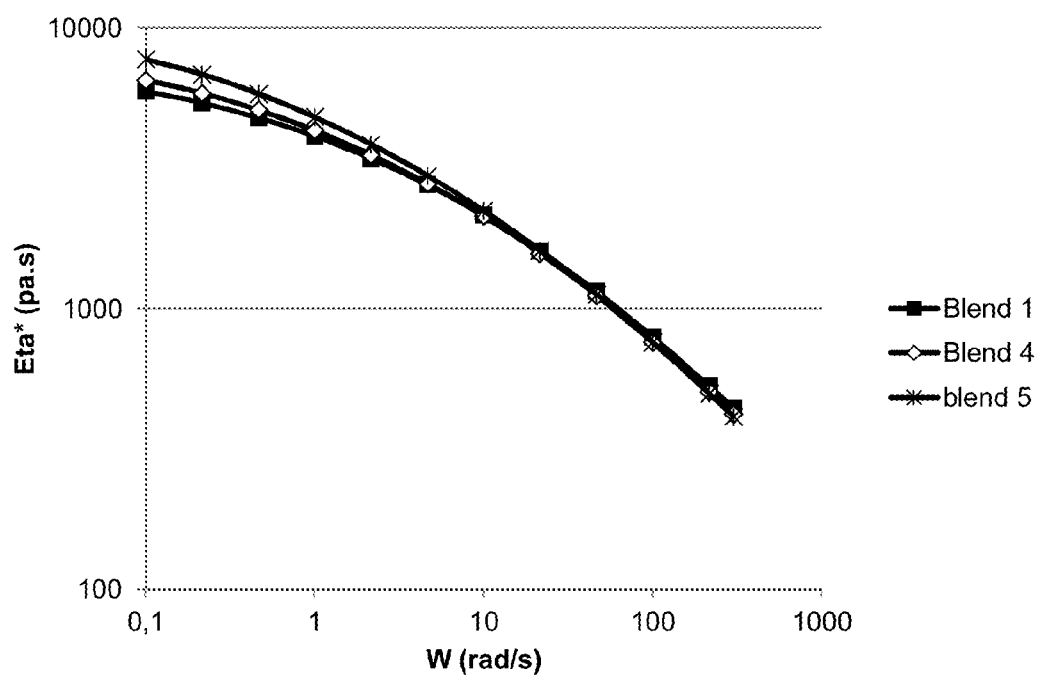
FIG. 3 represents a rheometric dynamic analysis ("RDA") graph plotting viscosity as a function of shear rate for three different polyethylene blends according to embodiments of the present invention.
Figure 4:
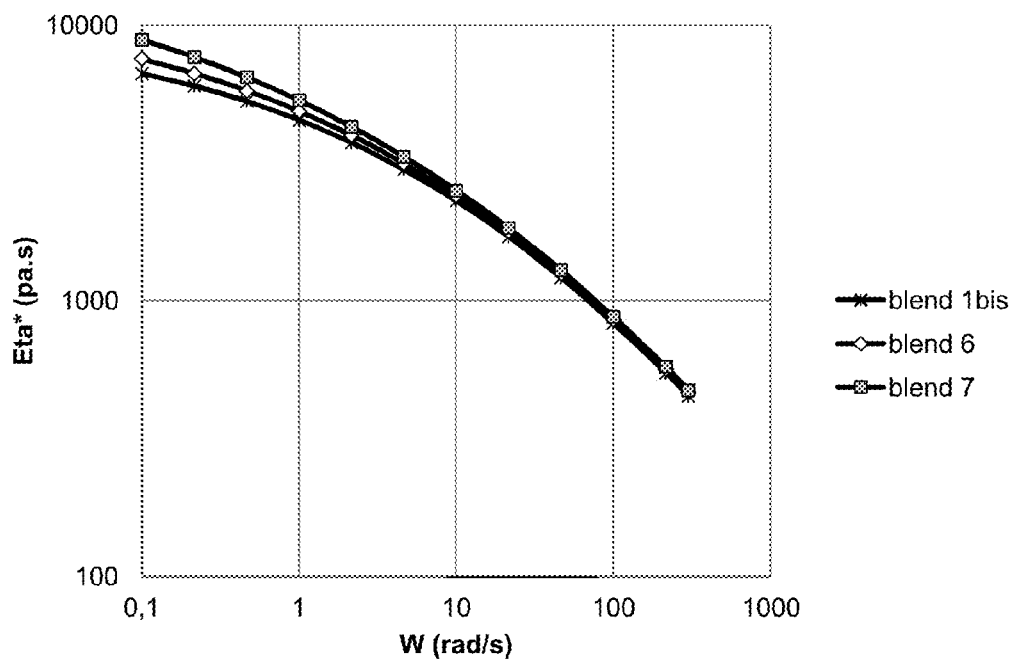
FIG. 4 represents a rheometric dynamic analysis ("RDA") graph plotting viscosity as a function of shear rate for three different polyethylene blends according to embodiments of the present invention.

RDA analyses (as described in Example D) were performed on the different blends. The results are shown in FIG. 3.

The addition of LDPE grade to a bimodal Ziegler-Natta-catalyzed polyethylene grade gave a blend having an improved blowability (=higher viscosity at low shear rate) with a similar injectability (=low viscosity at high shear rate).

Example F

Blends were prepared which comprised pellets Example 3 (described in example D) and a commercial recycled polyethylene (rPE). In this example, it is demonstrated that the addition of a rPE to a bimodal Ziegler-Natta-catalyzed polyethylene resin allows preparing blends having improved blowability with a similar injectability in comparison with 100% Ziegler-Natta-catalyzed polyethylene resin.

The rPE used was a commercially available polyethylene containing between 60 and 90 wt % (determined by NMR) of chromium-catalyzed polyethylene. The properties of rPE are shown in Table 11.

TABLE 11

| Grade (ground flakes) | | rPE |
|---|---|---|
| DENSITY | (kg/m$^3$) | 960 |
| MI-2 | (g/10 min) | 0.6-0.8 |
| HLMI | (g/10 min) | 50-60 |

Different blends were produced on a Brabender extruder:
Blend 1: 100 wt % of pellets example 3 (reference)
Blend 6: 10 wt % of rPE+90 wt % of pellets example 3
Blend 7: 25 wt % of rPE+75 wt % of pellets example 3
The properties of the blends are shown in Table 12:

TABLE 12

| | Blend 1bis | Blend 6 | Blend 7 |
|---|---|---|---|
| MI2-g/10 min | 1.7 | 1.6 | 1.4 |
| HLMI - g/10 min | 98 | 89 | 75.8 |
| Density - g/cm$^3$ | 0.96 | 0.96 | 0.96 |
| GPC | | | |
| Mn - g/mol | 11000 | 11500 | 12000 |
| Mw - g/mol | 110000 | 110000 | 110000 |
| Mz - g/mol | 650000 | 670000 | 690000 |
| d - (—) | 9.7 | 9.5 | 9.2 |
| d' - (—) | 6 | 6.1 | 6.3 |
| Charpy -kJ/m$^2$ | 4.3 | 4.3 | 5.6 |

RDA analyses (as described in Example D) were performed on the different blends. The results are shown in FIG. 3.

The addition of rPE grade to a bimodal Ziegler-Natta-catalyzed polyethylene grade gave a blend having an improved blowability (=higher viscosity at low shear rate) with a similar injectability (=low viscosity at high shear rate).

Example G

An example according to the invention was compared to examples X, Y, and Z of Table 1 in WO2011/057924. Comparative example 1 corresponds to comparative example Z of Table 1 in WO 2011/057924. Comparative example 2 corresponds to comparative example X of Table 1 in WO 2011/057924. Comparative example 3 corresponds to example Y of Table 1 in WO 2011/057924. Example 2 corresponds to Example 2 as prepared in Example B).

Melt strength was measured with a Göttfert Rheotens equipment. Melt strength experiments were similar to those recommended by Wagner et al. (M. H. Wagner, V. Schulze, and A. Göttfert, 'Rheotens-mastercurves and drawability of polymer melts', Polym. Eng. Sci. 36, 925, 1996). They were carried out at extrusion temperature of 190° C. (pre-heating 6 min), spinline length of 100 mm, acceleration of 30 mm/s$^2$, gear spacing of 0.4 mm, capillary die with length-to-diameter ratio of 30/2 mm, pressure sensor 0-500 bar, shear rate of 36 s$^{-1}$, normal cogwheels with cooling boxes, initial speed of 9 mm/s, upture detection of 500 mm/s, maximum speed of 1900 mm/s, acquisition 10 per s, measuring time 1000 s, and ring acceleration of 2 mm/s.

Figure 5:
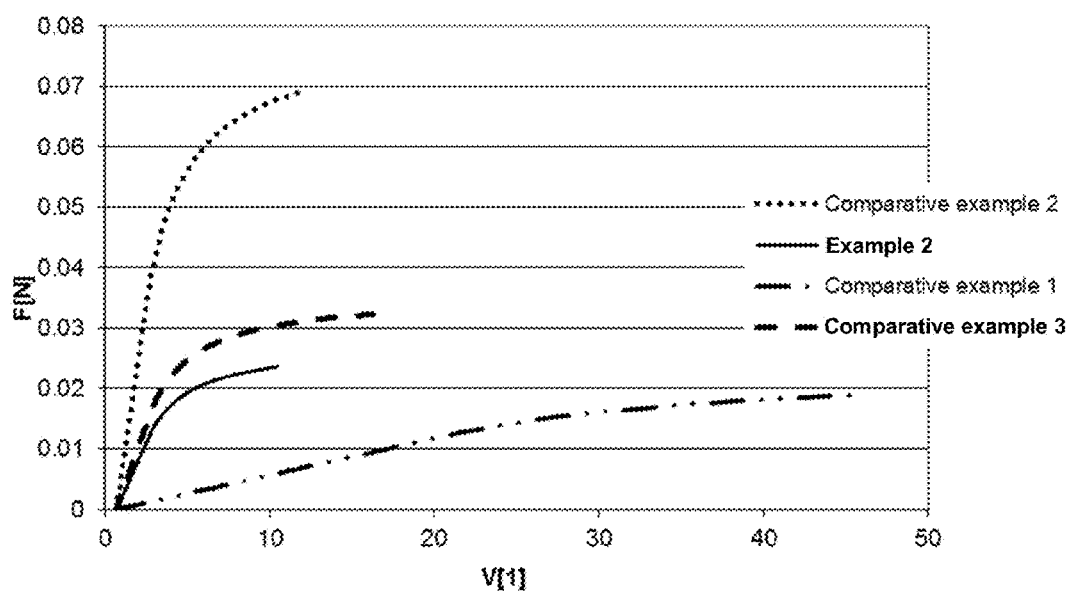
FIG. 5 represents a Rheotens graph plotting the force F as a function of the draw ratio V for a Ziegler-Natta catalyzed polyethylene resin according to an embodiment of the present invention versus comparative examples.

The results are shown in FIG. 5, which showed that the lower the melt flow, the better the melt strength and so the better the blowability.

Figure 6:
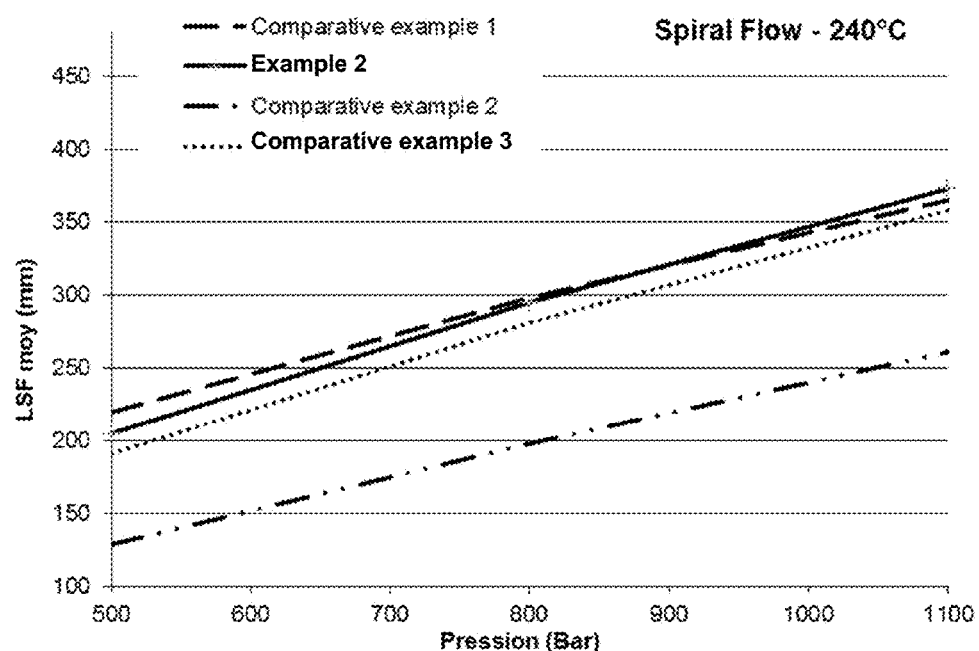
FIG. 6 represents a graph plotting spiral flow length (SFL) as a function of increasing injection pressure for a Ziegler-Natta catalyzed polyethylene resin according to an embodiment of the present invention versus comparative examples.

The spiral flow lengths have been measured at a temperature of 240° C. and respectively under injection pressures of 500, 800 and 1100 bars as described in Example B. Spiral flow lengths (LSF) for the resins tested have been reported as a function of increasing injection pressure at a temperature of 240° C. and are shown in FIG. 6. FIG. 6 shows also that the lower the melt flow, the lower the flow length so a priori the lower the injectability.

This was confirmed by preparing preforms (30 g) with the resins listed above, and the blowing of said preforms to make bottles. The conditions used for the injections were the same as that given in Example C.

Pellets Example 2 was injected with about 5 s as injection time. A glossy preform was obtained.

With 5 s as injection time it was not possible to produce shiny preforms with comparative example 3 grade polyethylene. In this case, flow lines were present on the outer surface of the preforms. For both preforms it was possible to get shiny preforms with injection time superior to 6 s. In other words, example 2 grade polyethylene allows having a broader process window for injection compared to comparative example 3 grade polyethylene in agreement with the results of the spiral flow tests.

With example 2 preforms produced at 5 s as injection time, bottles with very good optical properties (transparency, gloss, contact clarity) were obtained. This was not the case with comparative example 3 preforms produced at 5 s as injection time: the bottles presented a lot of marks linked to flow lines present on the preforms.

For preforms produced at least at 6 s, it was possible to produce bottles with good optical properties for both grades (example 2 and comparative example 3).

Consequently, this illustrates that example 2 grade allows a broader processing window for injection and blowing in order to obtain bottles with acceptable surface aspect in comparison with comparative example 3, even if melt strength is higher for comparative example 3 compared to example S. Thus, example 2 grade allows a better compromise for injection/blowing compared to comparative example 3.

Example H

Figure 7:
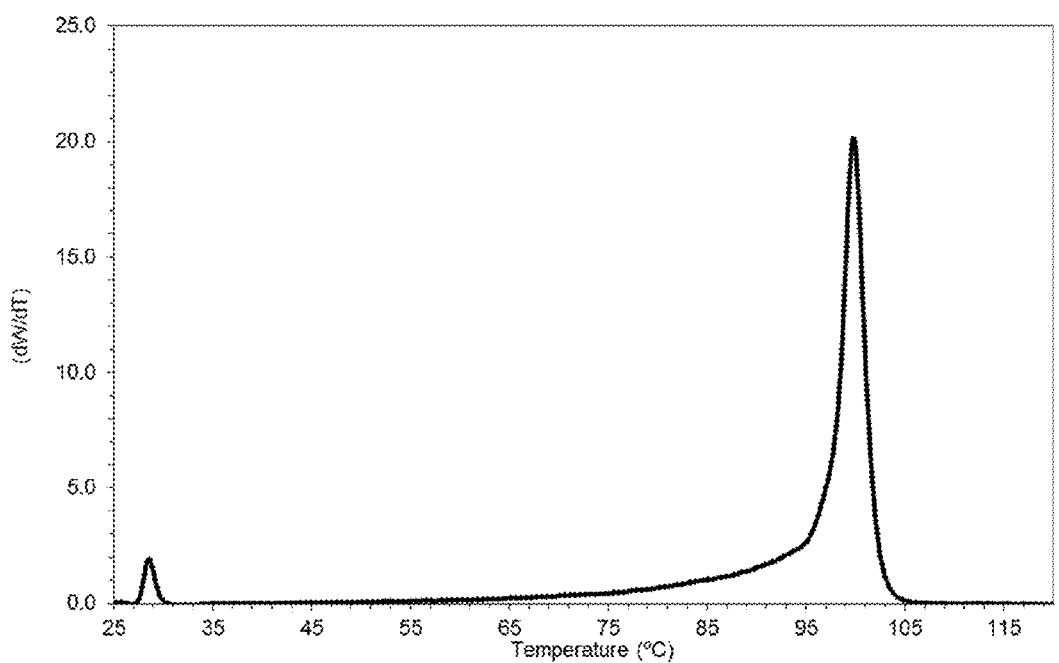
FIG. 7 represents a graph plotting a TREF (temperature rising elution fractionation) profile (dW/dT (%/° C.)) as a function of temperature for a polyethylene resin according to an embodiment of the present invention.

The resin of Example A was fractionated according to its chemical composition by a Temperature Rising Elution Fractionation (TREF) process. The results are shown in FIG. 7. FIG. 7 shows a plot typical for a slurry type bimodal HDPE resin with comonomer predominantly incorporated in the high molecular weight fraction.

Table 13 shows the percentages in wt % of the polyethylene that elutes below a given temperature, in % by weight.

TABLE 13

| Temperature (° C.) | wt % eluted |
|---|---|
| 35 | 2.5 |
| 40 | 2.6 |
| 45 | 2.7 |

TABLE 13-continued

| Temperature (° C.) | wt % eluted |
|---|---|
| 50 | 3.0 |
| 55 | 3.6 |
| 60 | 4.3 |
| 65 | 5.2 |
| 70 | 6.7 |
| 75 | 8.7 |
| 80 | 11.5 |
| 85 | 15.9 |
| 90 | 22.2 |
| 95 | 32.4 |
| 100 | 76.6 |
| 105 | 99.9 |
| 110 | 100.0 |

The invention claimed is:

1. An injection stretch blow molded article, comprising a Ziegler-Natta catalyzed polyethylene resin, wherein the polyethylene resin has a multimodal molecular weight distribution and comprises at least two polyethylene fractions comprising fraction A and fraction B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and
the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$, and has a High Load Melt Index (HLMI) of between 90 and 125 g/10 min as measured according to standard ISO 1133, condition G, at 190° C. and under a load of 21.6 kg.

2. The injection stretch blow molded article according to claim 1, wherein said fraction A has a melt index HL275 of at least 12 g/10 min and of at most 18 g/10 min.

3. The injection stretch blow molded article according to claim 1, wherein the polyethylene resin has a MI2 of at least 1.5 g/10 min and of at most 2.6 g/10 min.

4. The injection stretch blow molded article according to claim 1, wherein the polyethylene resin has a density of at least 955 kg/m$^3$ and of at most 962 kg/m$^3$.

5. The injection stretch blow molded article according to claim 1, wherein fraction A is present in an amount ranging from 44 to 49% by weight based on the total weight of polyethylene resin.

6. The injection stretch blow molded article according to claim 1, wherein the polyethylene resin is prepared in the presence of a Ziegler-Natta catalyst having a particle size D50 ranging from 5 μm to 20 μm.

7. The injection stretch blow molded article according to claim 1, wherein the polyethylene resin has a molecular weight distribution Mw/Mn of at least 7 and of at most 11, Mw being the weight-average molecular weight and Mn being the number-average molecular weight.

8. The injection stretch blow molded article according to claim 1, wherein the polyethylene resin has a Mz/Mw of at least 4.5 and of at most 6.5, Mz being the z-average molecular weight.

9. The injection stretch blow molded article according to claim 1, wherein said polyethylene resin is prepared in slurry conditions.

10. The injection stretch blow molded article according to claim 1, wherein the polyethylene resin has an environmental stress crack resistance measured with 100% Igepal CO-630 of at least 40 h.

11. The injection stretch blow molded article according to claim 1, wherein each reactor of the at least two reactors connected in series is a loop reactor.

12. The injection stretch blow molded article according to claim 1, wherein fraction A is prepared in a first reactor of the at least two reactors connected in series.

13. The injection stretch blow molded article according to claim 1, further comprising a low density polyethylene resin and/or a recycled polyethylene resin.

14. An injection stretch blow molded article, comprising:
a chromium-catalyzed polyethylene resin; and
a Ziegler-Natta catalyzed polyethylene resin, wherein the polyethylene resin has a multimodal molecular weight distribution and comprises at least two polyethylene fractions comprising fraction A and fraction B, fraction A having a higher molecular weight and a lower density than fraction B, each fraction prepared in different reactors of at least two reactors connected in series, wherein:
fraction A has a melt index HL275 of at least 11 g/10 min and of at most 20 g/10 min as determined according to ISO 1133, condition G, at 190° C. and under a load of 21.6 kg except that a die of 2.75 mm was used; and a density of at least 941 kg/m$^3$ and of at most 946 kg/m$^3$ as determined according to ASTM 1505 at a temperature of 23° C.; and
the polyethylene resin has a melt index MI2 of at least 1.5 g/10 min and of at most 3.0 g/10 min as determined according to ISO 1133, condition D, at 190° C. and under a load of 2.16 kg; and a density of at least 950 kg/m$^3$ and of at most 965 kg/m$^3$.

15. The injection stretch blow molded article according to claim 14, wherein said fraction A has a melt index HL275 of at least 12 g/10 min and of at most 18 g/10 min.

16. The injection stretch blow molded article according to claim 14, wherein the polyethylene resin has a MI2 of at least 1.5 g/10 min and of at most 2.6 g/10 min.

17. The injection stretch blow molded article according to claim 14, wherein the polyethylene resin has a density of at least 955 kg/m$^3$ and of at most 962 kg/m$^3$.

18. The injection stretch blow molded article according claim 14, wherein fraction A is present in an amount ranging from 44 to 49% by weight based on the total weight of polyethylene resin.

19. The injection stretch blow molded article according to claim 14, wherein the polyethylene resin is prepared in the presence of a Ziegler-Natta catalyst having a particle size D50 ranging from 5 μm to 20 μm.

20. The injection stretch blow molded article according to claim 1, wherein the polyethylene resin has a molecular weight distribution Mw/Mn of at least 7 and of at most 11, Mw being the weight-average molecular weight and Mn being the number-average molecular weight.

21. The injection stretch blow molded article according to claim 14, wherein the polyethylene resin has a Mz/Mw of at least 4.5 and of at most 6.5, Mz being the z-average molecular weight.

22. The injection stretch blow molded article according to claim 14, wherein said polyethylene resin is prepared in slurry conditions.

23. The injection stretch blow molded article according to claim 14, wherein the polyethylene resin has an environmental stress crack resistance measured with 100% Igepal CO-630 of at least 40 h.

24. The injection stretch blow molded article according to claim 14, wherein each reactor of the at least two reactors connected in series is a loop reactor.

25. The injection stretch blow molded article according to claim 14, wherein fraction A is prepared in a first reactor of the at least two reactors connected in series.

26. The injection stretch blow molded article according to claim 14, wherein the chromium-catalyzed polyethylene resin has a density of at least 0.950 g/cm$^3$ to at most 0.965 g/cm$^3$ and a melt index MI2 of at least 0.1 to at most 5.0 g/10 min.

* * * * *